United States Patent
Mitobe et al.

(10) Patent No.: US 8,896,789 B2
(45) Date of Patent: Nov. 25, 2014

(54) OPTICAL FILM, POLARIZING PLATE, IMAGE DISPLAY DEVICE, AND 3D IMAGE DISPLAY SYSTEM

(75) Inventors: Humitake Mitobe, Kanagawa (JP); Yuusuke Furuki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 276 days.

(21) Appl. No.: 13/459,816

(22) Filed: Apr. 30, 2012

(65) Prior Publication Data

US 2012/0287358 A1 Nov. 15, 2012

(30) Foreign Application Priority Data

May 13, 2011 (JP) .................................. 2011-108101

(51) Int. Cl.
  *G02F 1/1335* (2006.01)
  *G02B 5/30* (2006.01)
  *G02B 27/26* (2006.01)
  *H04N 13/04* (2006.01)
(52) U.S. Cl.
  CPC .............. *G02B 27/26* (2013.01); *G02B 5/3033* (2013.01); *H04N 13/0434* (2013.01)
  USPC ............................................ 349/96; 349/117
(58) Field of Classification Search
  CPC ... G02B 5/3016; G02B 27/26; G02F 1/13363
  USPC .................................................. 349/96, 117
  See application file for complete search history.

(56) References Cited

U.S. PATENT DOCUMENTS

2010/0208177 A1  8/2010  Kobayashi et al.
2011/0063424 A1  3/2011  Matsuhiro et al.

FOREIGN PATENT DOCUMENTS

| JP | 04-166915 A | 6/1992 |
| JP | 2000-231109 A | 8/2000 |
| JP | 2006-276697 A | 10/2006 |
| JP | 2009-103900 A | 5/2009 |
| JP | 2010-107542 A | 5/2010 |
| JP | 2011-59638 A | 3/2011 |

OTHER PUBLICATIONS

Official Action issued by Japanese Patent Office on May 21, 2013 in connection with Japanese Patent Application No. 2011-108101, which corresponds to the present application.
Official Action dated Dec. 24, 2013 issued by JPO in connection with corresponding Japanese Patent Application No. 2011-108101.

*Primary Examiner* — Lucy Chien

(74) *Attorney, Agent, or Firm* — Jean C. Edwards, Esq.; Edwards Neils PLLC

(57) ABSTRACT

Disclosed is an optical film in which a minute interference unevenness is reduced. The optical film comprises a transparent film having a thickness of 10 μm to 150 μm, and a first layer and a second layer, in this order, on the transparent film, wherein values of in-plain mean refractive indices thereof satisfy the formula: the second layer>the first layer>the transparent film; the difference in in-plane mean refractive indices between the first layer and the second layer and the difference in in-plane mean refractive indices between the first layer and the transparent film are each 0.02 or more; and the optical thickness D of the first layer satisfies the formula: $270 \times N - 150 - 75$ nm $\leq D \leq 270 \times N - 150 + 75$ nm ($1 \leq N \leq 8$ where N is a natural number).

20 Claims, 2 Drawing Sheets

(a)　　　　　　　　　　(b)

(a)　　　　　　　　　　(b)

OPTICAL FILM, POLARIZING PLATE, IMAGE DISPLAY DEVICE, AND 3D IMAGE DISPLAY SYSTEM

CROSS-REFERENCE TO RELATED APPLICATIONS

The present application claims the benefit of priority from Japanese Patent Application No. 108101/2011, filed on May 13, 2011, the contents of which are herein incorporated by reference in their entirety.

BACKGROUND OF THE INVENTION

1. Field of the Invention

The present invention relates to technology for reducing minute interference unevenness of an optical film disposed at the viewing side of a three dimensional (3D) image display device, and a polarizing plate, an image display device, and a 3D image display system each utilizing the same.

2. Background Art

A 3D image display having a λ/4 plate in front of the display panel at the viewing side has been proposed. The λ/4 plate is disposed on a surface, at the viewing side, of the display panel together with a polarizing film for the formation of a circularly polarized image. The in-plane slow axis of the λ/4 plate for this purpose should be controlled in a specific direction in relation to the absorption axis of a polarizing film. Furthermore, in a passive glasses type, a patterned λ/4 plate having alternately-disposed patterns which have orthogonal in-plane slow axes to each other needs to be used. The in-plane slow axes could be readily controlled if a λ/4 plate can be manufactured with a liquid crystal composition. The in-plane slow axis of a retardation layer formed of a liquid-crystalline compound is typically controlled with an alignment layer.

An optical film having a retardation film composed of an alignment layer and a liquid-crystalline compound on a support made of a transparent film has widely been used as an optically-compensatory film in a liquid-crystal display device. Since the optically-compensatory film is disposed between a liquid crystal cell and a polarizing film, any interference at the interface between an alignment layer and a retardation layer does not affect its display performance. Accordingly, in the optically-compensatory film having such a structure, issues concerning interference at the interface between an alignment layer and a retarding layer has been rarely studied. However, in the form of the use described above, i.e. a configuration of the optical film disposed in the exterior, at the viewing side, of the polarizing film, interference due to difference in refractive indices at the interface between an alignment layer and a retardation layer may affect the display performance.

Uneven interference is generally known to occur in a laminate composed of multiple optical thin films, and it can be reduced by achieving a uniform thickness of each optical thin layer or reducing the difference in refractive indices at the interface. However, complete elimination of the uneven thickness is technically difficult, and a reduction of the difference in refractive indices is also difficult because it restricts the scope of choice for usable materials. Although a light scattering layer disposed on or in the laminate can reduces uneven interference, a light scattering layer disposed at the viewing side of an image display device has disadvantages such as clarity loss on the image display surface and a decrease in the image contrast.

It is well known that uneven interference can be attributed to an uneven thickness of a cell gap or a liquid crystal layer since many optical thin layers, such as a pixel electrode layer, alignment layer, and color filter, laminated on the inner face of a glass substrate in a liquid cell of a liquid crystal display device. Measures to solve this problem are proposed (for example, JP-A-4-166915 and JP-A-2000-231109).

SUMMARY OF THE INVENTION

The inventors have actually observed an optical film composed of multiple optical thin layers and disposed outside a display panel and further outside a polarizing film, and found that human-eye detectable minute flickering, which has heretofore been unknown, appears during black display or power off. This flickering is caused by uneven interference with a pitch of several nanometers at the interfaces between multiple optical thin layers forming the optical film. Such uneven interference is different from those solved in JP-A-4-166915 and JP-A-2000-231109 described above.

An object of the present invention, which has been made in consideration of the above-mentioned problems, is to reduce a minute interference unevenness of an optical film composed of multiple optical thin layers.

Specifically, the present invention provides an optical film disposed at the viewing side of a 3D image display device and having a reduced minute interference unevenness, and a polarizing plate, an image display device, and a 3D image display system each including the optical film.

The means to solve the above problem is as follows:

<1> A optical film comprising a transparent film having a thickness of 10 μm to 150 μm, and a first layer and a second layer, in this order, on the transparent film, wherein values of in-plain mean refractive indices thereof satisfy the formula:

the second layer>the first layer>the transparent film;

the difference in in-plane mean refractive indices between the first layer and the second layer and the difference in in-plane mean refractive indices between the first layer and the transparent film are each 0.02 or more; and the optical thickness D of the first layer satisfies the formula:

$$270 \times N - 150 - 75 \text{ nm} \leq D \leq 270 \times N - 150 + 75 \text{ nm} (1 \leq N \leq 8$$
$$\text{where } N \text{ is a natural number)}.$$

<2> The optical film according to <1>, wherein the first layer is an alignment layer and the second layer is a retardation layer comprising a liquid-crystalline compound.

<3> The optical film according to <1> or <2>, comprising at least one hard coat layer on the other side of the transparent film.

<4> An optical film comprising a transparent film having a thickness of 10 μm to 150 μm, an alignment layer and a retardation layer, in this order, on the transparent film, and at least one hard coat layer on the other side of the transparent film, wherein values of in-plain mean refractive indices thereof satisfy the formula:

the retardation layer>the alignment layer>the transparent film;

the difference in in-plane mean refractive indices between the retardation layer and the alignment layer and the difference in in-plane mean refractive indices between the alignment layer and the transparent film are each 0.02 or more; and the optical thickness D of the alignment layer satisfies the formula:

1200−75 nm≤D≤1200+75 nm.

<5> The optical film according to any one of <1> to <4>, wherein the transparent film is a cellulose acylate film or a cyclic olefin polymer film.

<6> The optical film according to any one of <3> to <5>, comprising a low refractive index layer disposed on the hard coat layer deposited on the opposite side of the transparent film;
the low refractive index layer having a refractive index lower than a refractive index of the transparent film.

<7> The optical film according to <6>, comprising at least one high refractive index layer having a refractive index higher than a refractive index of the transparent film.

<8> The optical film according to any one of <1> to <7>, having an in-plane retardation at 550 nm of 80 to 200 nm and a retardation in thickness direction at 550 nm of −100 to 200 nm.

<9> The optical film according to any one of <2> to <8>, wherein the liquid-crystalline compound is a discotic-like or rod-like liquid-crystalline compound.

<10> The optical film according to any one of <2> to <9>, wherein the retardation layer comprising the liquid-crystalline compound is a patterned retardation layer comprising alternately-disposed patterns of a first and a second retardation regions which differ each other with respect to at least one of the in-plane slow axis and the in-plane retardation.

<11> A polarizing plate comprising an optical film according to any one of <1> to <10> and a polarizing film.

<12> The polarizing plate according to <11>, wherein the second layer in the optical film is a retardation layer and the in-plane slow axis of the retardation layer intersects the absorption axis of the polarizing film at an angle of 45°.

<13> An image display device comprising a display panel and the polarizing plate according to <11> or <12> disposed at the viewing side of the display panel.

<14> A 3D image display system comprising at least one image display device according to <13>; and
a polarizing film which allows an image displayed on the image display device to transmit so as to be perceived as a 3D image.

The present invention can reduce a minute interference unevenness in an optical film composed of multiple optical thin layers.

Specifically, the present invention provides an optical film disposed at the viewing side of a 3D image display device and having a reduced minute interference unevenness, and a polarizing plate, an image display device, and 3D image display system each including the optical film.

Figure 1:
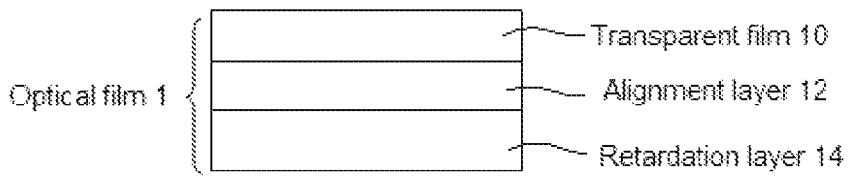
FIG. 1 is a schematic cross-sectional view of an optical film in accordance with an embodiment of the present invention.

In the above figures, 1, 1' and 1" stand for optical film, 10 stands for transparent film, 12 stands for alignment layer, 14 stands for retardation layer, 16 stands for polarizing film, 18 stands for display panel, 20 stands for hard coat layer, and 22 stands for low refractive index layer.

BEST MODE FOR CARRYING OUT THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelength-selective-filter or according to the exchange of the measurement value by the program.

When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (B):

$$Re(\theta) = \qquad (A)$$

$$\left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nz}\right)\right)\right)^2}} \right] \times \frac{d}{\cos\left(\sin^{-1}\left(\frac{\sin(-\theta)}{nx}\right)\right)}$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx+ny)/2 - nz\} \times d \qquad (B):$$

In the formula, nx represents a refractive index in the in-plane slow axis direction; ny represents a refractive index in the in-plane direction perpendicular to nx; and nz represents a refractive index in the direction perpendicular to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below:

cellulose acylate (1.48), cycloolefin polymer (1.52), polycarbonate (1.59), polymethylmethacrylate (1.49) and polystyrene (1.59). KOBRA 21ADH or WR calculates nx, ny and nz, upon enter of the hypothetical values of these mean refractive indices and the film thickness. On the basis of thus-calculated nx, ny and nz, Nz=(nx−nz)/(nx−ny) is further calculated.

In the description, the term "visible light" is used for any light having wavelengths from 380 nm to 780 nm. In the description, the wavelength of measurement is 550 nm as far as there is no specific notation.

In the description, the angles (for example, "90°") and the relations thereof (for example, expression of "orthogonal", "parallel" or "crossed by 45°") should be interpreted so as to include errors generally acceptable in the technical field to which the present invention belongs. For example, the angle desirably falls within a range of an exact angle ± an angle less than 10°, more desirably within a range of an exact angle ±5°, or even more desirably within a range of an exact angle ±3°.

The present invention relates to an optical film comprising a transparent film, and a first layer and a second layer, in this order, on a surface of the transparent film, wherein values of in-plain mean refractive indices thereof satisfy the expression: the second layer>the first layer>the transparent film, and the differences in in-plain mean refractive indices between the first and second layers and between the first layer and the transparent film are each 0.02 or more.

Thus, in an optical film with a structure of laminated layers having different refractive indices, interference occurs at the interfaces between the layers. In the case where the optical film is disposed outside the polarizing film at the viewing side of the image display device, interference unevenness with a pitch of several nanometers is perceived by an observer as minute flickering during black display or power off. In the present invention, the optical thickness of the first layer is set within a range of 270×N−150±75 nm (1≤N≤8 where N is a natural number) in order to reduce the interference unevenness with a pitch of several nanometers.

An optical compensation film comprising an alignment layer and a retardation layer composed of a liquid-crystalline compound on a transparent film has been widely used in a conventional liquid crystal display device. In the optical compensation film having such a structure, the interference also occurs at the interface between the alignment layer and the retardation layer. However, flickering due to the interference unevenness described above does not occur because the optical compensation film is disposed between the liquid crystal cell and the polarizing film. The inventors have discovered the following fact: minute flickering occurs when the optical film having the foregoing structure is disposed outside the viewing side of the polarizing film and such flickering is caused by the interference unevenness with a pitch of several nanometers at an interface in the optical film.

Figure 7:
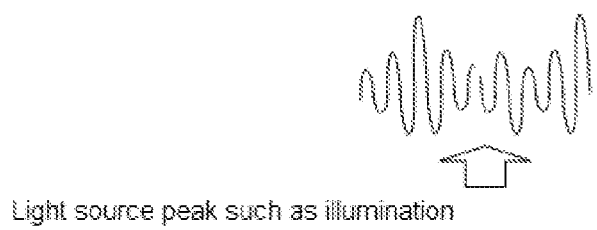
FIG. 7 is a schematic view used for explaining the mechanism of the present invention.

As a result of extensive investigations by the present inventors, it was found that the intensity of the reflected light varies at a pitch of several nanometers in the case where the transparent film especially used as a support has a thickness of 10 to 150 μm, the first layer has a thickness of about 0.05 to about 1.4 μm, and the second layer has a thickness of about 0.5 to about 4 μm, which are relatively thick for an optical thin layer. Further investigations, as shown schematically in FIG. 7, have found that this phenomenon is due to a difference in the intensity of interference undulation caused by the superposition of multiple interferences, and the difference in the undulation intensity is perceived as flickering on the display. A further investigation revealed that flickering is particularly noticeable under a light source containing emission lines, such as three-wavelength light source used in, for example, illumination. As the results of further investigations based on these findings, the inventors have found that adjusting the optical thickness of the first layer to a predetermined range allows the positions of the weak interference undulation to coincide with the emission lines and thereby the fluctuations of the interference undulation to be reduced, resulting in a reduction in human-eye detectable minute flickering. The present invention has been thereby completed.

Specifically, in the present invention, the optical thickness of the first optical layer is adjusted within a range of 270×N−150±75 nm (1≤N≤8 where N is a natural number). If the optical thickness of the first layer is within the range of 270×N−150±75 nm (1≤N≤8 where N is a natural number), the weak undulation positions coincide with the emission lines, so that the deviation within a range of ±75 nm does not cause human-eye detectable fluctuations. A smaller range of error is desirable. The range is preferably within ±50 nm and more preferably within ±25 nm.

In the statement that the optical thickness of the first layer D is in a range of 270×N−150±75 nm (1≤N≤8 where N is a natural number), the term "is in the range of 270×N−150±75 nm" refers to "satisfies the formula: $270 \times N-150-75$ nm$\leq D \leq 270 \times N-150+75$ nm", that is, $270 \times N-225$ nm$\leq D \leq 270 \times N-75$ nm".

The formula described above is defined by a natural number N of 1 to 8, so that the optical thickness of the first layer D has a range indicated in the table below. The cases of error ranges of ±50 nm and ±25 nm are also shown.

TABLE 1

| N | Range of optical thickness of first layer D Error: ±75 nm | | Range of optical thickness of first layer D Error: ±50 nm | | Range of optical thickness of first layer D Error: ±25 nm | |
|---|---|---|---|---|---|---|
|   | Lower limit (nm) | Upper limit (nm) | Lower limit (nm) | Upper limit (nm) | Lower limit (nm) | Upper limit (nm) |
| 1 | 45   | 195  | 70   | 170  | 95   | 145  |
| 2 | 315  | 465  | 340  | 440  | 365  | 415  |
| 3 | 585  | 735  | 610  | 710  | 635  | 685  |
| 4 | 855  | 1005 | 880  | 980  | 905  | 955  |
| 5 | 1125 | 1275 | 1150 | 1250 | 1175 | 1225 |
| 6 | 1395 | 1545 | 1420 | 1520 | 1445 | 1495 |
| 7 | 1665 | 1815 | 1690 | 1790 | 1715 | 1765 |
| 8 | 1935 | 2085 | 1960 | 2060 | 1985 | 2035 |

From the viewpoint of manufacturing stability and cost, N is preferably 3 to 6, and more preferably 5. The optical thickness of the first layer D is preferably in the range of 1200±75 nm, more preferably 1200±50 nm, and furthermore preferably 1200±25 nm.

In the optical film of the present invention, values of in-plain mean refractive indices satisfy the formula: the second layer>the first layer>the transparent layer, and the differences in in-plane mean refractive indices between the first and second layers and between the first layer and the transparent film are each 0.02 or more. No particular restriction exists if these formulae are satisfied. Preferably the differences in in-plain mean refractive indices between the first and second layers and between the first layer and the transparent film are each 0.03 or more. The in-plain mean refractive index of the first layer is preferably an intermediate value of the in-plane mean refractive indices of the second layer and the transparent film so as to further reduce the interference unevenness. In an embodiment where the first layer is an alignment layer, the in-plane mean refractive index is typically in the range of about 1.48 to about 1.6, although depending on the type of the main ingredient polymer. Accordingly, in an embodiment where the first layer is an alignment layer, the first layer has a thickness of about 30 to about 1400 nm in order to obtain an optical thickness D within the above-described range (where N is 1 to 8), although this thickness is not restrictive.

The refractive index can be determined through direct measurement with an Abbe refractometer or by spectroreflectometry or spectroscopic ellipsometry.

The second layer may have any in-plain mean refractive index within the range satisfying the foregoing relation. The in-plain mean refractive index of a retardation layer formed by fixing the alignment of a discotic-like liquid-crystalline compound or a rod-like liquid-crystalline compound is typically about 1.5 to about 1.65, although depending on the type of the liquid-crystalline compound. The in-plain mean refractive index of a polymer film used for a transparent film is typically about 1.47 to about 1.6.

As described above, the transparent film of the optical film of the present invention has a thickness of preferably 10 to 150 μm, and more preferably 10 to 85 μm. The thickness within this range enhances the advantageous effect of the present invention.

As described above, the second layer of an optical film of the present invention has a thickness of preferably 0.5 to 4 μm, and more preferably 0.9 to 1.8 μm in view of optical characteristics.

FIG. 1 illustrates a schematic cross-sectional view of the optical film in accordance with an embodiment of the present invention. Note that the depicted relationship between layers does not reflect the actual relationship. The same applies to the other figures.

The optical film 1 in FIG. 1 has an alignment layer 12 and a retardation layer 14 comprising a liquid-crystalline compound fixed in an alignment state, on a surface of a transparent film 10. In the embodiment illustrated in FIG. 1, the alignment layer 12 and the retardation film 14 correspond to the first layer and the second layer, respectively.

Figure 2:
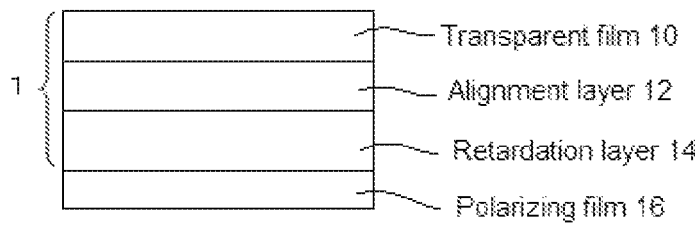
FIG. 2 is a schematic cross-sectional view of an image display device in accordance with an embodiment of the present invention.
Figure 2:

The optical film 1 is disposed at the viewing side of a display panel 18 together with a linear polarizing film 16 as illustrated FIG. 2. With reference to FIG. 2, in order to bond the optical film 1 to the polarizing film 16, the surface of the retardation layer 14 may be bonded to a surface of the polarizing film 16. In an embodiment of a display panel 18 such as a liquid crystal panel that has a polarizing film on its viewing side, the polarizing film 16 may be omitted. In the case of a display panel 18, such as a liquid crystal panel, having a polarizing film at the viewing side and another polarizing film 16 together with an optical film, the absorption axes of the polarizing film on the viewing side of the display panel and the other polarizing film 16 are disposed parallel to each other.

The optical film 1 functions as a λ/4 plate based on mainly optical properties of a retarding layer 14 and, as necessary, optical properties of the transparent film 10 as a combination. The in-plane slow axis of the optical film 1 intersects the absorption axis of the polarizing film 16 at an angle of 45°, and thus the transparent film 1 functions as a circularly-polarizing plate in combination with the polarizing film 16. The display panel 18 controls the transmittance of the incident light from a light source (not shown) disposed behind the panel in order to display an image. This image is converted to a circularly-polarized image through the polarizing film 16 and the optical film 1 disposed at the viewing side of the panel. An observer can perceive the circularly-polarized image as a 3D image through a pair of passive or active circularly-polarizing glasses.

The mean in-plane refractive indices of the components, i.e., a transparent film 10, an alignment layer 12, and a retardation layer 14 of the optical film 1, satisfy the formula: the retardation layer 14<the alignment layer 12<the transparent film 10, so that interferences occur at the interface between the retardation layer 14 and the alignment layer 12 and combine with each other to create an interference undulation having a pitch of several nanometers. This undulation is perceived by an observer as minute flickering during black display or power off. Since the alignment layer 12 in the optical film 1 has an optical film thickness within the range of $270 \times N-150 \pm 75$ nm ($1 \leq N \leq 8$ where N is a natural number), the positions at a low level of interference undulation almost coincides with the emission lines of three-wavelength light sources used for illumination. This leads to a reduction in the interference undulation that causes minute flickering.

Figure 3:
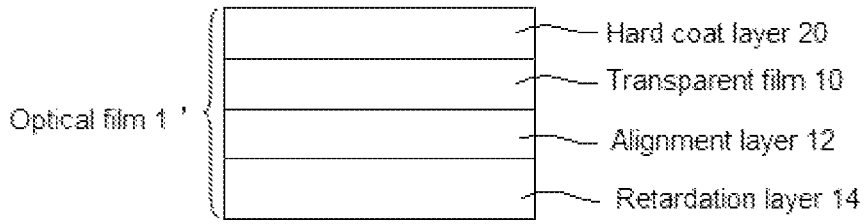
FIG. 3 is a schematic cross-sectional view of an optical film in accordance with another embodiment of the present invention.
Figure 4:
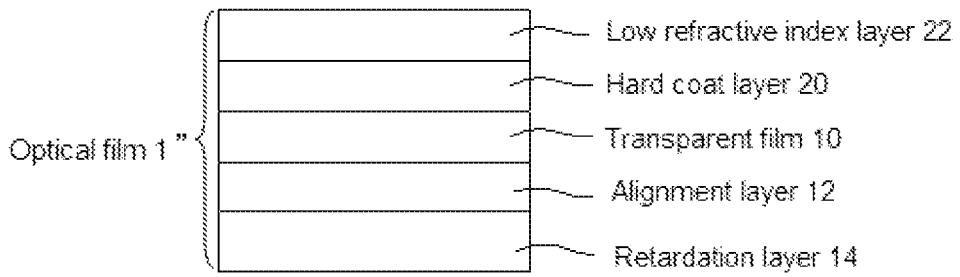
FIG. 4 is a schematic cross-sectional view of an optical film in accordance with a further embodiment of the present invention.

FIGS. 3 and 4 show schematic cross-sectional views of other optical films of the present invention. The same members as members in FIG. 1 are given the same reference numerals without their detailed description.

The optical film 1' illustrated in FIG. 3 has a hard coat layer 20 on the rear surface of the transparent film 10 (the side on which the alignment layer 12 and the retardation layer 14 are not disposed). The optical film 1" illustrated in FIG. 4 has a low refractive index layer 22 disposed outside the hard coat layer 20. If the optical film 1' or 1" is disposed together with a polarizing film at the viewing side of the display panel, as illustrated in FIG. 2, the surface of the retardation layer 14 is bonded and laminated to the surface of the polarizing film.

The optical films 1' and 1", each provided with the hard coat layer 20, have improved resistance to physical impact from the outside. The optical film 1" further has a low refractive index layer 22 which can reduce the reflection of outer light and contributes to a further improvement in image display quality. In view of an optical design to achieve an anti-reflective surface film, the relationship between the in-plane mean refractive indices of the hard coat layer 20 and the transparent film 10 in the optical film 1' and 1" preferably satisfies: hard coat layer 20>transparent film 10, and the relationship between the in-plane mean refractive indices of the hard coat layer 20 and the low refractive index layer 22 preferably satisfies the formula: hard coat layer 20>low refractive index layer 22.

In a preferred embodiment of the optical films 1' and 1", the transparent film 10 has a thickness of 10 μm to 150 μm, the retardation film 14 has a thickness of 0.5 μm to 4 μm, and the hard coat layer and the low refractive index layer each have a thickness of 0.4 μm to 35 μm; the relation of the in-plane mean refractive indices satisfies the formula: retardation layer 14>alignment layer 12>transparent film 10; and the difference in in-plane mean refractive indices between the retardation layer 14 and the alignment layer 12, and the difference in in-plane mean refractive indices between the alignment layer 12 and the transparent film are each 0.02 or more; and the optical thickness of the alignment layer 12 is in the range of 1200 nm±75 nm (more preferably 1200 nm±50 nm, furthermore preferably 1200 nm±25 nm). In this embodiment, it is preferred that the formula: hard coat layer 20>transparent film 10 is satisfied.

Figure 5:
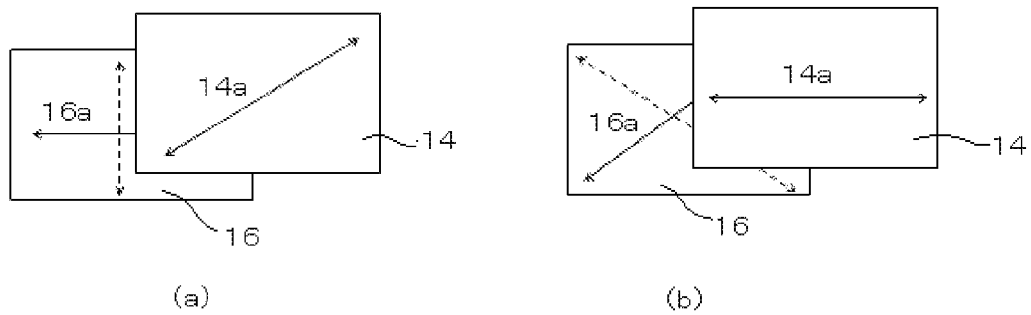
FIG. 5 is a schematic view illustrating the relationship between the axis of an optical film and the axis of a polarizing film of a polarizing plate in accordance with an embodiment of the present invention.

In FIG. 1 to FIG. 4, the retardation layer 14 preferably exhibits the optical properties of the λ/4 layer alone or in combination with the transparent film 10. In an embodiment where the optical film is used in the system of active circularly-polarizing glasses, the retardation layer 14 is a uniform retardation layer, and, as shown in FIGS. 5(*a*) and 5(*b*), the in-plane slow axis 14*a* of the retardation layer 14 is orthogonal to the absorption axis 16*a* of the polarizing film 16. In the case where the horizontal direction in FIG. 5 corresponds to the horizontal direction of the display, as shown in FIG. 5(*a*), the in-plane slow axis 14*a* of the retardation layer 14 is inclined at 45° (or 135°) from the horizontal direction of the display, and the absorption axis 16*a* of the polarizing film 16 is either in the horizontal direction or in the vertical direction of the display. Alternatively, as shown in FIG. 5(*b*), the in-plane slow axis 14*a* of the retardation layer 14 is in the horizontal or vertical direction and the absorption axis 16*a* of the polarizing film 16 is in the direction of 45° (or) 135° of the display.

Figure 6:
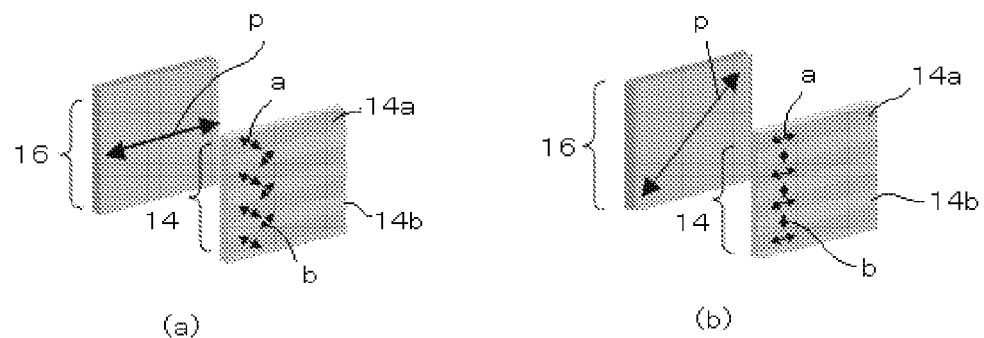
FIG. 6 is a schematic view illustrating the relationship between the axis of an optical film and the axis of a polarizing film of a polarizing plate in accordance with another embodiment of the present invention.

In an embodiment where the optical film is used in the system of passive circularly-polarizing glasses, the retardation layer 14 is preferably a patterned λ/4 layer. FIGS. 6(*a*) and 6(*b*) illustrate a patterned λ/4 layer having alternately disposed striped-patterns composed of the first and the second retardation areas 14*a* and 14*b* in which each slow axis is orthogonal to adjacent ones and each in-plane retardation is λ/4. The in-plane slow axes (a) and (b) of the retardation areas 14*a* and 14*b* may be, as illustrated in FIG. 6(*a*), in the direction of −45° and +45°, respectively, from the horizontal direction of the display, or, as illustrated in FIG. 6(*b*), in the direction of 0° and 90°, respectively, from the horizontal direction of the display. Similar to the system of active circularly-polarizing glasses, as shown in FIGS. 6(*a*) and 6(*b*), the slow axes (a) and (b) of the retardation layer 14 are orthogonal to the absorption axis (p) of the polarizing film 16.

The present invention also relates to a polarizing plate having an optical film and a polarizing film of the present invention. As illustrated in FIG. 2, the polarizing plate is disposed on the viewing side of the display panel such that the polarizing film faces the display panel. The polarizing plate may be any one of a circularly-polarizing plate, an elliptically-polarizing plate, and a linearly-polarizing plate. In an embodiment where the polarizing plate is used for a 3D image display device, the circularly-polarizing plate is preferred, and the optical film of the present invention is preferably a λ/4 plate.

The present invention relates to an image display device having at least an optical film and a display panel of the present invention. In an embodiment where an optical film of the present invention is a retardation plate, as illustrated in FIG. 2, the optical film is disposed at the viewing side of the display panel together with a linearly-polarizing film, and converts images displayed on the display panel to circularly-polarized or elliptically-polarized images. An observer can perceive the circularly-polarized or elliptically-polarized image as a stereoscopic image through a polarizing plate such as active polarizing glasses (for example, circularly-polarizing glasses). Alternatively, in an embodiment where the optical film of the present invention is a patterned retardation plate, as illustrated in FIG. 2, the optical film is disposed at the viewing side of the display panel together with a linearly-polarizing plate, and converts images displayed on the display panel to circularly-polarized or elliptically-polarized images for right and left eyes having opposite rotational directions of polarization. An observer can perceive the resulting circularly-polarized or elliptically-polarized image as a stereoscopic image through polarizing plates such as a pair of passive polarizing glasses (for example, circularly-polarizing glasses).

The present invention can be applied to any display panels without restriction, for example, liquid crystal panels including liquid crystal layers, EL display panels including organic EL layers, and plasma display panels. In any embodiment, various structures can be adopted. Since a liquid crystal panel has a polarizing film for displaying an image on the viewing side, the optical film of the present invention may be laminated alone on the polarizing film disposed on the viewing side of the liquid crystal panel.

One example of the display panels is a liquid crystal panel of a transmission mode having a pair of polarizing films and a liquid crystal panel disposed therebetween. Retardation films for viewing angle compensation are typically disposed between each polarizing film and a liquid crystal cell. The liquid crystal cell can have any structure and a liquid crystal cell having a typical structure can be used. The liquid crystal cell includes, for example, a pair of substrates facing each other, a liquid crystal layer disposed between the pair of substrates, and which may have a color filter if necessary. The liquid crystal cell may have any driving mode without restrictions, such as a twisted nematic (TN) mode, a super twisted nematic (STN) mode, a vertical alignment (VA) mode, an in-plane switching (IPS) mode, and an optically compensated bend cell (OCB).

The present invention also relates to a three-dimensional image display system at least including a three-dimensional image display device and a polarizing plate disposed at the viewing side of the three-dimensional image display device, a viewer being capable of catching three-dimensional images from the device through the polarizing plate. One example of the polarizing plate disposed at the exterior of the viewing side of the three dimensional image display device is a pair of polarizing glasses worn by an observer. An observer catches polarized images for a right eye and a left eye through a pair of circularly or linearly polarized glasses to perceive a three dimensional image. The polarizing glasses may be either of active type or passive type.

Various members used in the manufacture of an optical film will now be described in detail.

The optical film of the present invention has a first layer and a second layer on a surface of a transparent film, wherein their in-plain mean refractive indices satisfy the formula: the second layer>the first layer>the transparent film, and the differences in in-plain mean refractive indices between the first and second layers and between the first layer and the transparent film are each 0.02 or more. The first layer and the second layer do not have any other limitation if the foregoing relationships concerning the refractive index are satisfied. The advantageous effect of the present invention is achieved in an embodiment where the first layer has a thickness of about 0.05 to about 1.4 μm and the second layer has a thickness of about 0.5 to about 4 μm. The layers having a thickness in the range described above can be stably produced through coating of organic materials, so that the first and second layers preferably comprise organic materials formed by coating.

In one embodiment, the optical film of the present invention comprises an alignment layer as the first layer, and a retardation layer comprising a liquid-crystalline compound fixed in an alignment state as the second layer on a surface of the transparent film. The optical film of this embodiment exhibits optical properties based on the optical properties of the retardation layer or the combination of the optical properties of the retardation layer and transparent film. Preferred optical properties depends on the application, and it is preferable that Re(550) be 80 to 200 nm and Rth(550) be −100 to 200 nm so that the optical film is disposed together with a polarizing film at the viewing side of the display panel and functions as a circularly-polarizing plate or elliptically-polarizing plate. The optical film functioning as a circularly-polarizing plate is preferably a λ/4 plate, more preferably has an Re(550) of 115 to 160 nm and an Rth(550) of −50 to 100 nm in this embodiment.

<Transparent Film>

The transparent film of the optical film of the present invention has preferably a thickness of 10 to 150 μm more preferably 10 to 85 μm since the thickness within this range enhances the advantageous effect of the present invention. The optical film may have various optical properties depending on the application. For example, a polymer film having a low retardation value, specifically an absolute value of Re of 50 nm or less, may be used. Of course, a retardation film may be used as a transparent film.

Materials for forming the transparent film which is useful in the present invention include polycarbonate series polymers, polyester series polymers such as polyethylene terephthalate and polyethylene naphthalate, acryl series polymers such as polymethylmethacrylate, and styrene series polymers such as polystyrene and acryl nitrile/styrene copolymer (AS resin). Specific examples thereof include also polyolefins such as polyethylene and polypropylene, polyolefin series polymers such as ethylene/propylene copolymers, vinyl chloride series polymers, amide series polymers such as nylon and aromatic polyamide, imide series polymers, sulfone series polymers, polyether sulfone series polymers, polyether ether ketone series polymers, polyphenylene sulfide series polymers, vinylidene chloride series polymers, vinyl alcohol series polymers, vinyl butyral series polymers, arylate series polymers, polyoxymethylene series polymers, epoxy series polymers and any mixtures thereof. The cured layer of any UV cure or thermal cure resins such as acryl, urethane, acryl urethane, epoxy or silicone series cure resins may be also used.

Preferable examples of the material, constituting the transparent support, include thermoplastic norbornene-type reins. Examples of the thermoplastic norbornene-type rein include ZEONEX and ZEONOR (manufactured by ZEON Corporation) and ARTON (manufactured by JSR Corporation).

Preferable examples of the material, constituting the transparent support, include also cellulose series polymers (occasionally referred to as cellulose acylate hereinafter) such as cellulose triacetate used as a transparent protective film of a polarizing plate conventionally.

The transparent film can be produced by any process, for example, a solvent casting process or a melt extrusion process. The film may be preliminarily subjected to stretching treatment for control of retardation.

The in-plain mean refractive index of the polymer film exemplified above is typically about 1.47 to about 1.6.

<First Layer>

In one embodiment, the optical film of the present invention has an alignment layer as a first layer. The alignment layer may be made from any material, and preferably an organic material such as polymer as a main component. Examples of the material for the alignment layer include modified or unmodified polyvinyl alcohol, acrylic copolymers, and methacrylic copolymers. A layer comprising such a material as a main component and having an average in-plane refractive index of about 1.48 to about 1.62 and a thickness of about 0.05 μm to 1.4 μm can achieve an optical thickness in the range satisfying the condition for a first layer of the present invention. The layer having this range can be formed stably by coating.

<Second Layer>

In one embodiment, the optical film of the present invention has a retardation layer having a liquid compound as a second layer. A liquid compound is preferably fixed in an alignment state. An example is a retardation layer formed by curing a polymer composition containing a polymerizable liquid compound in an alignment state by polymerization reaction. The retardation layer exhibit retardation properties derived from the alignment of the liquid-crystalline compound.

The liquid-crystalline compound used may have any structure. The liquid-crystalline compounds can be classified into a rod liquid-crystalline compound and a discotic liquid-crystalline compound according to the shape of the molecule. In the present invention, either can be used. For example, the retardation layer having a desired range of Re, such as a λ/4 plate, can be formed by aligning the long axis of a rod liquid-crystalline compound parallel to its layer plane or aligning the disk plane of a discotic liquid-crystalline compound perpendicularly to its layer plane, followed by fixing its aligned state.

The in-plane slow axis of the retardation layer composed of a liquid-crystalline compound can be controlled by the direction of alignment treatment applied to the alignment layer formed as a first layer. An example is a rubbing treatment applied to the surface of the alignment layer, and typically the long axis of the liquid-crystalline molecule is aligned parallel or perpendicularly to the direction of the rubbing treatment.

Another example is a light irradiation treatment applied to a photo-alignment layer. The alignment of the liquid-crystalline compound may be controlled using a photo alignment layer having aligning ability induced in accordance with the polarization direction of the radiated light or the radiation direction of the light so that the slow axis is controlled in a desired direction. The alignment of the liquid crystal may be controlled using an alignment controlling agent together with the liquid-crystalline compound. For this purpose, various conventional techniques utilized for the preparation of optically-compensatory films and liquid crystal layers in liquid crystal cells can be also used.

The second layer may be a patterned retardation layer. In this embodiment, the first layer, i.e., an alignment layer, is preferably a patterned alignment layer treated by a mask rubbing or mask exposure process. The patterned retardation layer may be formed by any conventional technique such as pattern printing.

A layer formed by fixing an alignment state of a liquid-crystalline compound has an in-plane mean refractive index of about 1.5 to about 1.65, and various layers satisfy the relationship to the transparent film and the first layer in terms of the in-plane mean refractive index.

From the viewpoint of enhancing the advantageous effect of the present invention, the second layer has a thickness of preferably 0.5 to 4 μm, and more preferably 0.9 to 1.8 μm. The layer satisfying this range can be formed stably by coating a liquid crystal composition.

<Surface Layer>

The optical film of the present invention may have one or more hard coat layers on the other side (on which the first layer and the second layer are not disposed) of the transparent film. The in-plane mean refractive index of the layers disposed on the other side of the transparent film preferably satisfies: hard coat layer>transparent film from the viewpoint of the optical design for an antireflective surface. The mean refractive index of the hardcore layer is typically about 1.48 to about 2.

The thickness of the hard coat layer is preferably 0.4 to 35 μm, and more preferably 5 to 20 μm from the viewpoint of imparting sufficient durability and impact resistance.

The optical film of the present invention comprises a low refractive index layer having a lower in-plane mean refractive index than the hard coat layer, on the outer surface of the hard coat layer. The lamination of the hard coat layer with the low refractive index layer is preferred because it can reduce the reflection of outer light and thus improve the display performance. A low refractive index layer having an in-plane mean refractive index of about 1.3 to about 1.47 can provide this effect; however, this range is not restrictive.

Although a structure including only a low refractive index layer can reduce the reflectance, a combination of a high refractive index layer having a high refractive index and a low refractive index layer having a low refractive index can enhance the antireflective ability. Examples of the layer structure include a double-layer structure of a high refractive index layer and a low refractive index layer in this order from the hard coat layer; and a triple-layer structure of three layers having different refractive indexes, i.e., a medium refractive index layer, a high refractive index layer, and a low refractive index layer in this order from the hard coat layer, the medium refractive index layer having a refractive index higher than that of the underlying layer and lower than that of the high refractive index layer. Laminated structures including more antireflection layers are also proposed. In particular, from the viewpoint of durability, optical properties, cost and productivity, it is preferred that a medium refractive index layer, a high refractive index layer, and a low refractive index layer are disposed in this order on the hard coat layer. Examples of such a structure are disclosed in JP-A Nos. 8-122504, 8-110401, 10-300902, 2002-243906, 2000-111706. An antireflection film of triple-layer structure having excellent robustness against a variation in the film thickness is disclosed in JP-A-2008-262187. The antireflection film of triple-layer structure on the surface of the image display device achieves an average reflectance of 0.5% or less. Thus the reflection of the external light can be reduced significantly, and thereby excellent three-dimensional images can be provided. Furthermore, any other functions may be provided to each layer, such as a lower refractive index with contamination resistance, a high refractive index layer with antistatic properties, and a hard coat layer with antistatic properties (as disclosed in JP-A Nos. 10-206603, 2002-243906, and 2007-264113)

Examples of the specific layer structure having a hard coat layer or a low refractive index layer are given below:
Hard coat layer;
Low refractive index layer;
(Hard coat layer)/(low refractive index layer);
(Hard coat layer)/(high refractive index layer)/(low refractive index layer); and
(Hard coat layer)/(medium refractive index layer)/(high refractive index layer)/(low refractive index layer).

<Polarizing Film>

A polarizing film usable in the present invention is a typical linearly polarizing film. The polarizing film may be a stretched film or a layer formed by coating. Examples of the former include stretched films formed by stretching polyvinyl alcohol stained with iodine or a dichroic dye. Examples of the latter include layers formed by coating dichroic dye-containing compositions and fixing the dye in a predetermined alignment state.

The term "polarizing film" here refers to linearly polarizing film.

<Liquid Crystal Cell>

Any mode of liquid crystal cell can be used in the image display device of the present invention. Preferred modes include a VA mode, OCB mode, IPS mode, and TN mode.

In a TN liquid crystal cell, rod liquid crystal molecules are aligned substantially horizontally and are twisted in the range of 60° to 120° during no voltage application. The TN liquid crystal cells are most widely used in color TFT liquid crystal displays, and are described in many publications.

In a VA liquid crystal cell, rod liquid crystal molecules are aligned substantially vertically during no voltage application. The VA liquid crystal cells includes (1) liquid crystal cells of VA mode in a narrow sense in which the rod liquid crystal molecules are aligned substantially vertically during no voltage application and aligned substantially horizontally during voltage application (described in JP-A-2-176625); (2) liquid crystal cells of a multi-domain VA mode (MVA mode) for expanding the viewing angle (SID97, Digest of tech. papers (proceedings) 28 (1997), 845); (3) liquid crystal cells of a mode (n-ASM mode) in which the rod liquid crystal molecules are aligned substantially vertically during no voltage application and are aligned in a form of a twisted multi-domain during voltage application (described in the proceedings of Nippon Ekisho Toronkai (Japanese Liquid Crystal Society) (1998), 58-59); and (4) a liquid crystal cell of SURVIVAL mode (reported at LCD International 98). The VA liquid crystal display device may be driven in any mode of PVA (patterned vertical alignment, photo alignment (optical alignment), and PSA (polymer-sustained alignment). The details of these modes are described in JP-A-2006-215326, and JP-T-2008-538819.

An IPS liquid crystal cell contains rod liquid crystal molecules aligned substantially parallel to the substrate. The liquid crystal molecules respond in plane during application of an electric field parallel to the surface of the substrate. An IPS liquid crystal cell displays black during application of no electric field, and the transmission axes of a pair of upper and lower polarizing plates are orthogonal to each other. Countermeasures for eliminating light leakage in the oblique direction during black display with optically compensatory sheets to expand the viewing angle are disclosed in patent literature such as JP-A Nos. 10-54982, 11-202323, 9-292522, 11-133408, 11-305217, and 10-307291.

<Polarizing Plate for Three-Dimensional Image Display System>

In the three-dimensional image display system of the present invention, a viewer watches stereoscopic images called 3D images through a polarizing plate. In one embodiment, the polarizing plate is a pair of polarizing glasses. In the embodiment where the optical film is a λ/4 plate forming a circularly polarized image together with a polarizing plate, a pair of circularly-polarizing glasses are used. The circularly-polarizing glasses may be of either active (shutter glasses) or passive type.

Examples

The invention is further explained Paragraphs below will further specifically describe features of the present invention, referring to Examples and Comparative Examples. Any materials, amount of use, ratio, details of processing, procedures of processing and so forth shown in Examples may appropriately be modified without departing from the spirit of the present invention. Therefore, it is to be understood that the scope of the present invention should not be interpreted in a limited manner based on the specific examples shown below.

In Examples and Comparative Examples, Re(550) and Rth (550) are determined with an automatic birefringence analyzer "KOBRA-21ADH" (manufactured by Oji Scientific Instruments Co., Ltd.) at a wavelength of 550 nm, if not otherwise specified. The refractive index was determined through direct measurement with an Abbe refractometer or by spectroreflectometry or spectroscopic ellipsometry.

(Preparation of Optical Films in Examples 1 to 37 and Comparative Examples 1 to 26)

<Formation of Optically Anisotropic Layer Having Liquid-Crystalline Compound>

<<Alkaline Saponification Treatment>>

A cellulose acylate film "TD80UL" (manufactured by Fuji Film Co., LTD) was passed through induction type heated rolls at 60° C. so that the surface temperature of the film was raised to 40° C. An alkaline solution having a composition described below was then applied onto a band surface of the film in a coating amount of 14 ml/m² with a bar coater. The resulting film was then passed under a steam-type far infrared heater (manufactured by Noritake Co., LTD) set at 110° C. for 10 seconds. Similarly, purified water was then applied onto the film in a coating amount of 3 ml/m² with a bar coater. Subsequently, the film was rinsed with a fountain coater and dehydrated with an air knife three times. Then, the film was transferred into a drying zone set at 70° C. for 10 seconds to provide a cellulose acylate film having undergone alkaline saponification treatment.

<Composition of Alkaline Solution>

| Composition of alkaline solution (parts by mass) | |
|---|---|
| Potassium hydroxide | 4.7 parts by mass |
| Water | 15.8 parts by mass |
| Isopropyl alcohol | 63.7 parts by mass |
| Surface active agent | 1.0 parts by mass |
| SF-1: $C_{14}H_{29}O(CH_2CH_2O)_{20}H$ | |
| Propylene glycol | 14.8 parts by mass |

<Formation of Alignment Layer>

A coating solution having the following composition for an alignment layer was continuously applied onto a long saponified cellulose acetate film with a wire bar (#14). The coating was dried for 60 seconds with warm air of 60° C. and then for 120 seconds with warm air of 100° C. to form each of alignment layers having thicknesses in the table below. The mean refractive index was 1.53.

The thicknesses of the alignment layers listed in the table below were achieved by appropriately determining the type of the wire bar and the concentration of the coating solution.

| Composition of coating solution for alignment layer | |
|---|---|
| Modified polyvinyl alcohol shown below | 10 parts by mass |
| Water | 371 parts by mass |
| Methanol | 119 parts by mass |
| Glutaraldehyde | 0.5 parts by mass |
| Photopolymerization initiator (Irgacure 2959 from Ciba Japan K.K.) | 0.3 parts by mass |

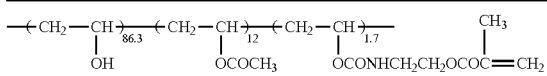

Modified polyvinyl alcohol

<Formation of Optically Anisotropic Layer Having a Discotic Liquid-Crystalline Compound>

The resulting alignment layers were subjected to the rubbing treatment continuously. During this process, the longitudinal direction is parallel to the conveying direction of the long film, and the rotation axis of the rubbing roller was set at 45° clockwise to the longitudinal direction.

A coating solution A of the following composition containing a discotic liquid-crystalline compound was applied continuously onto the alignment layer prepared as described above with a wire bar coater. The conveying rate (V) of the film was set at 36 m/min. The film was heated for 90 seconds with warm air at 120° C. for evaporation of the solvent in the coating solution and for alignment aging of the discotic liquid-crystalline compound. Subsequently the alignment of the liquid-crystalline compound was fixed by irradiation with UV rays at 80° C., thereby forming an optically anisotropic layer having a thickness of 1.6 μm. The mean refractive index of the optically anisotropic layer was 1.6.

| Coating solution for optically anisotropic layer (A) | |
|---|---|
| Discotic liquid-crystalline compound shown below | 91 parts by mass |
| Acrylate monomer *1 | 5 parts by mass |
| Photopolymerization initiator (Irgacure 907 from Ciba Geigy Ltd.) | 3 parts by mass |
| Sensitizer (Kayacure DETX from Nippon Kayaku Co., Ltd) | 1 part by mass |
| Pyridinium salt shown below | 0.5 parts by mass |
| Fluoropolymer (FP1) shown below | 0.2 parts by mass |
| Fluoropolymer (FP3) shown below | 0.1 parts by mass |
| Methyl ethyl ketone | 189 parts by mass |

Coating solution for optically anisotropic layer (A)

*1 Ethyleneoxide-modified trimethylolpropane triacrylate (V#360, from Osaka Organic Chemistry Co., Ltd.)

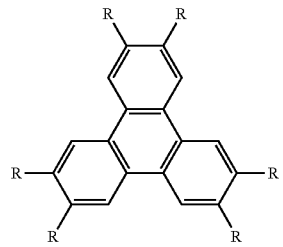

Discotic liquid crystalline compound

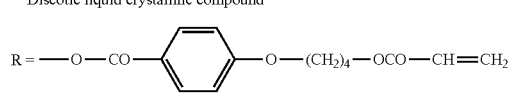

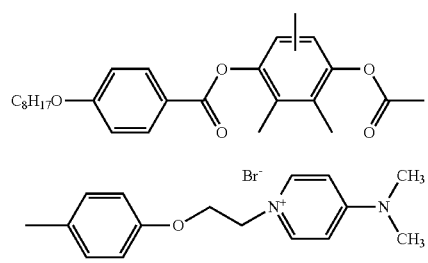

Pyridinum salt

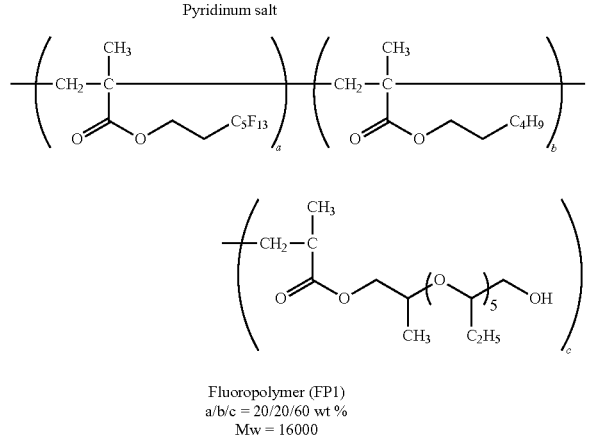

Fluoropolymer (FP1)
a/b/c = 20/20/60 wt %
Mw = 16000

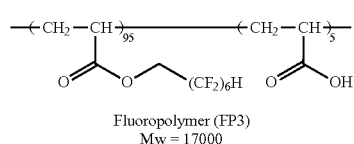

Fluoropolymer (FP3)
Mw = 17000

The resulting optical film had an Re(550) of 125 nm and an Rth(550) of −3 nm at 550 nm. The direction of the slow axis was orthogonal to the rotation axis of the rubbing roller, that is, at 45° anticlockwise to the longitudinal direction of the substrate. The mean tilt angle of the disc plane of the discotic liquid-crystalline molecule to the film face was 90°. The results confirmed that the discotic liquid-crystalline molecule was aligned in such a way that the disc plane was vertical to the film plane.

(Preparation of Coating Composition for Hard Coat Layer)

The composition described below was charged into a mixing tank and the resulting solution was stirred and then filtered through a polypropylene filter having a pore size of 0.4 μm to prepare a coating solution for a hard coat layer (solid content: 58 mass %).

| Solvent: methyl acetate | 36.2 parts by mass |
| Solvent: methyl ethyl ketone | 36.2 parts by mass |
| (a) Monomer: PETA | 77.0 parts by mass |
| (b) Monomer: urethane monomer | 20.0 parts by mass |
| Photopolymerization initiator | 3.0 parts by mass |
| (Irgacure 184 from Ciba Geigy Ltd.) | |
| Leveling agent (SP-13) | 0.02 parts by mass |

Each of the compounds used are shown below.

PETA: available from Shin-Nakamura Chemical Co., Ltd.; the structure is shown below; the mass average molecular weight is 325; and the number of the functional group is 3.5 (average).

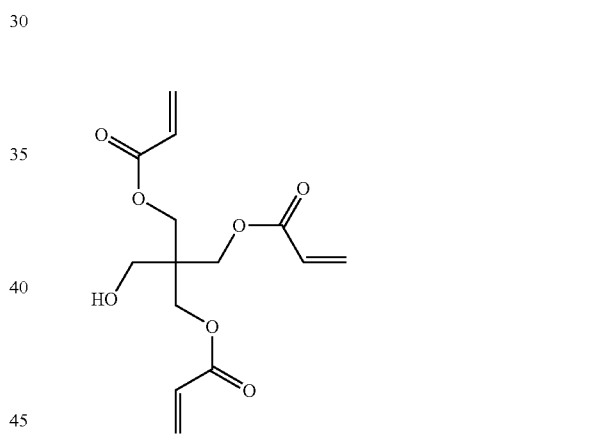

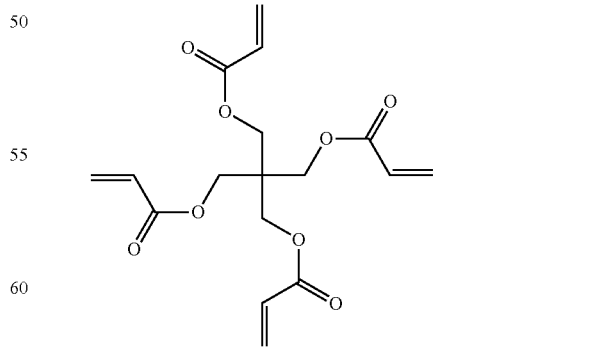

Urethane monomer: the structure is shown below; the mass average molecular weight is 596; and the number of the functional group is 4.

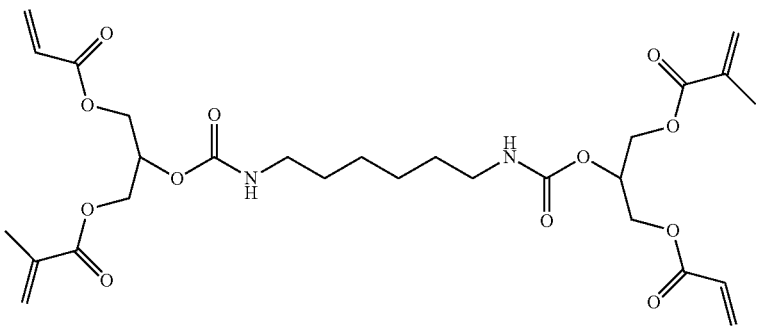 [SMILES: C=CC(=O)OCC(COC(=O)C(=C)C)OC(=O)NCCCCCCNC(=O)OC(COC(=O)C=C)COC(=O)C(=C)C]

Leveling Agent SP-13

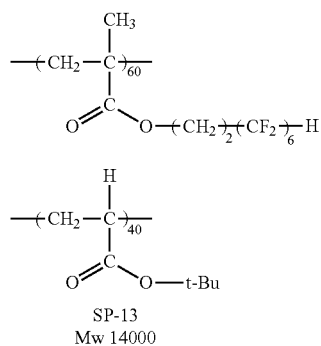

SP-13
Mw 14000

(Preparation of Coating Composition for Low Refractive Index Layer)

Each component was mixed at a ratio described below, and dissolved in a mixture of MEK/MMPG-AC (85/15: mass ratio) to prepare a coating solution for a low refractive index layer (solid content: 5 mass %)

Composition of Coating Solution for Low Refractive Index Layer

| | |
|---|---|
| Perfluoro-olefin copolymer described below | 15 parts by mass |
| DPHA | 7 parts by mass |
| DEFENSA MCF-323 | 5 parts by mass |
| Fluorine-containing polymerizable compound | 20 parts by mass |
| Hollow silica fine particles (as solid) | 50 parts by mass |
| Irgacure 127 | 3 parts by mass |

Each of the compounds used are shown below.

Perfluoro-Olefin Copolymer

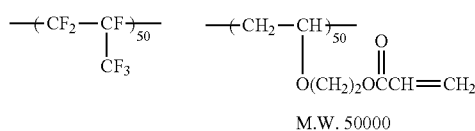

M.W. 50000

In the formula, 50:50 is a molar ratio.
Fluorine-Containing Polymerizable Compound

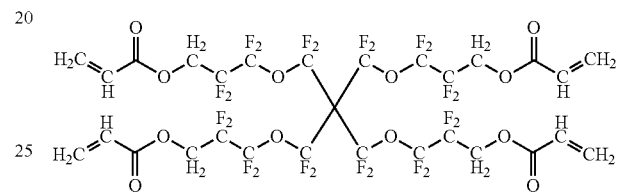

DPHA: a mixture of dipentaerythritol pentaacrylate and dipentaerythritol hexaacrylate mixture (from NIPPON KAY-AKU Co., Ltd.)
DEFENSA MCF-323: fluorine-containing surfactant (from Dainippon Ink and Chemicals, Inc.)
IRGACURE 127: photopolymerization initiator (from Ciba Japan K.K.)
Hollow silica: hollow silica fine particle dispersion (average particle size: 45 nm, refractive index: 1.25, surface-treated with a silane coupling agent having an acryloyl group, 20% MEK dispersion)
MEK: ethyl methyl ketone
MMPG-Ac: propylene glycol monomethyl ether acetate
(Formation of Hard Coat Layer and Low Refractive Index Layer)

The coating solution for a hard coat layer was applied on the side, where the optically-anisotropic layer is not coated, of the substrate of the optical film with a die coater (coating amount on a solid basis: 12 g/m$^2$). The coating was dried at 100° C. for 60 seconds and then cured by irradiation with ultraviolet rays from a 160 W/cm air-cooled metal halide lamp (from Eye Graphics Co., Ltd.) at an illuminance of 400 mW/cm$^2$ in an exposure dose of 150 mJ/cm$^2$ in the atmosphere while the system was purged with nitrogen into an oxygen concentration of 0.1 vol % or less, thereby forming an optical film with a hard coat layer. The coating solution for the foregoing low refractive index layer was applied on the hard coat layer. The drying conditions of the low refractive index layer were 70° C. and 60 seconds, and the ultraviolet curing conditions were such that an air-cooled metal halide lamp (from Eye Graphics Co., Ltd.) of 240 W/cm was used at an illuminance of 600 mW/cm$^2$ and an exposure dose of 300 mJ/cm$^2$ while the system was purged with nitrogen into an oxygen concentration of 0.1 vol % or less. The low refractive index layer had a refractive index of 1.34 and a thickness of 95 nm. The moisture permeability (the amount of moisture transmission for 24 hours) of the cellulose acylate film "TD80UL" used was 430 g/m$^2$/day at 40° C. 90% RH.

Thus, as shown below, optical films in Examples 1 to 37, and Comparative Examples 1 to 26 having alignment layers with different thicknesses were each prepared.

(Preparation of Optical Films in Example 38, Comparative Example 27 and Comparative Example 30)

In the preparation of each of Example 21, Comparative Example 11 and Comparative Example 16, after the formation of the hard coat layer, the coating solution for the medium refractive index layer (Mn-1) was applied. The drying conditions were 90° C. and 30 seconds, and the ultraviolet curing conditions were such that an air-cooled metal halide lamp (manufactured by Eye Graphics Co., Ltd.) of 180 W/cm was used at an illuminance of 300 mW/cm$^2$ and an exposure dose of 240 mJ/cm$^2$ while the system was purged with nitrogen into an oxygen concentration of 1.0 vol % or less. The medium refractive index layer had a refractive index of 1.62 and a thickness of 60 nm.

The coating solution for the high refractive index layer (Hn-1) was then applied onto the resulting medium refractive index layer. The drying conditions were 90° C. and 30 seconds, and the ultraviolet curing conditions were such that an air-cooled metal halide lamp (manufactured by Eye Graphics Co., Ltd.) of 240 W/cm was used at an illuminance of 300 mW/cm$^2$ and an exposure dose of 240 mJ/cm$^2$ while the system was purged with nitrogen into an oxygen concentration of 1.0 vol % or less. The high refractive index layer had a refractive index of 1.72 and a thickness of 110 nm.

The coating solution for the low refractive index layer was then applied onto the resulting high refractive index layer in the same manner described above to prepare a low refractive index layer. Thus, the optical films in Example 38, Comparative Example 27 and Comparative Example 30 each were formed by laminating a hard coat layer, a medium refractive index layer, a high refractive index layer, and a low refractive index layer in this order.

(Preparation of Optical Films in Example 39, Comparative Example 28 and Comparative Example 31)

Optical films provided with hard coat layers in Example 39, Comparative Example 28, and Comparative Example 31 were prepared. These optical films are used for preparation of the optical films in Example 21, Comparative Example 11 and Comparative Example 16, respectively.

(Preparation of Optical Films in Example 40, Comparative Example 29 and Comparative Example 32)

Optical films provided with optically anisotropic layers in Example 40, Comparative Example 29, and Comparative Example 32 were prepared. These optical films are used for preparation of the optical films in Example 21, Comparative Example 11 and Comparative Example 16, respectively.

(Preparation of Optical Film in Example 41)

<Preparation of Transparent Substrate (Cellulose Acylate Film T1)>

The following composition was placed into a mixing tank, and was dissolved with stirring and heating. A cellulose acylate solution (Dope A: solid content 22% by mass) was prepared.

(Composition of Cellulose Acetate Solution (Dope A))

| | |
|---|---|
| Cellulose acetate: acetyl substitution degree of 2.86 | 100 parts by mass |
| Triphenyl phosphate (plasticizer) | 7.8 parts by mass |
| Biphenyl diphenyl phosphate (plasticizer) | 3.9 parts by mass |
| Ultraviolet absorber (TINUVIN 328 from Ciba Japan K.K.) | 0.9 parts by mass |
| Ultraviolet absorber (TINUVIN 326 from Ciba Japan K.K.) | 0.2 parts by mass |

-continued

| | |
|---|---|
| Methylene chloride (first solvent) | 336 parts by mass |
| Methanol (second solvent) | 29 parts by mass |
| 1-Butanol (third solvent) | 11 parts by mass |

Silica particles having an average particle size of 16 nm (AEROSIL R972 from Nippon Aerosil Co., Ltd.) were added to the dope A to prepare a matt agent-containing dope B having 0.02 parts by mass of the silica particles relative to 100 parts by mass of cellulose acetate. The solid content of the dope B was adjusted to 19% by mass with the same solvent composition used in Dope A.

The dope A as a main stream for the middle layer, together with the matt agent-containing dope B for the top and bottom layers, was cast using a band stretching machine. After the temperature of the film surface on the band reached 40° C., the film was dried in warm air at 70° C. for one minute. The film was then peeled off from the band and dried in dry air at 140° C. for 10 minutes, to prepare a cellulose acetate film T1 with a residual solvent level of 0.3% by mass. The flow rate was controlled so that the thicknesses of the top and bottom layers were each 3 μm and the thickness of the main middle layer was 144 μm.

The resulting long cellulose acetate film T1 had a width of 2300 mm and a thickness of 150 μm with an in-plane retardation (Re) of 6 nm and a retardation in thickness direction (Rth) of 88 nm.

The optical film in Example 41 was prepared as in Example 21 except that cellulose acylate film, "TD80UL" (manufactured by Fuji Film Co., LTD) was used as a cellulose acetate film T1.

(Preparation of Optical Films in Examples 42 to 46)

<Preparation of Transparent Film (Cellulose Acetate Films T2 to T4)>

The cellulose acetate films T2 to T4 were prepared in the same manner as the cellulose acetate film T1 except that the thickness of the main stream was controlled to 34 μm to 94 μm.

The resulting cellulose acetate films T2 to T4 has a thickness of 40 to 100 μm with an in-plane retardation (Re) of 125 nm and a retardation in thickness direction (Rth) of 21 to 57 nm.

<Preparation of Transparent Substrates (Cellulose Acetate Films T5 and T6)>

The cellulose acetate films T5 and T6 each were prepared in the same manner as the cellulose acetate film T1 except that the cellulose acetate solution (dope A) was applied on a glass substrate in a thickness of 10 μm to 20 μm using a die coater.

The optical films in Examples 42 to 46 were prepared as in Example 41 except that the cellulose acetate film T1 was replaced with cellulose acetate films T2 to T6, respectively.

(Preparation of the Optical Films of Comparative Examples 33 to 38)

The optical films of Comparative Examples 33 to 38 were prepared as in Examples 41 to 46, respectively, except that the thickness of the alignment layer was changed to 695 μm.

(Preparation of the Optical Films of Comparative Examples 39 to 44)

The optical films of Comparative Examples 39 to 44 were prepared as in Examples 41 to 46, respectively, except that the thickness of the alignment layer was changed to 870 μm.

(Preparation of the Optical Film in Example 47)

The commercially available cellulose acylate film, "TD80UL" (manufactured by Fuji Film Co., LTD) was subjected to an alkaline saponification treatment, and then a coating solution for the alignment layer described below was applied onto the saponified film into a thickness of 785 nm with a wire bar coater. The coating was dried for 60 seconds with warm air of 60° C. and for 120 seconds with warm air of 100° C. to form a film. Then, the resulting film was rubbed at 45° to the longitudinal direction to form an alignment layer. Saponification was performed in the similar manner to the treatment used in the preparation of the optical film in Example 1.

| Composition of coating solution for alignment layer | |
| --- | --- |
| Modified polyvinyl alcohol shown below | 10 parts by mass |
| Water | 371 parts by mass |
| Methanol | 119 parts by mass |
| Glutaraldehyde | 0.5 parts by mass |

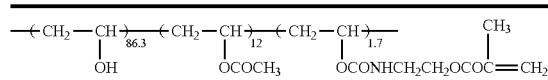

Modified polyvinyl alcohol

The coating solution of the following composition for the optically-anisotropic layer was then applied with a wire bar.

| Composition of coating solution for optically anisotropic layer | |
| --- | --- |
| Rod liquid-crystalline compound shown below | 1.8 g |
| Ethylene oxide-modified trimethylolpropane triacrylate (V#360, from Osaka Organic Chemical Industry, Ltd.) | 0.2 g |
| Polymerization initiator (Irgacure 907 from CIBA Inc.) | 0.06 g |
| Sensitizer (Kayacure DETX (from Nippon Kayaku Co., Ltd.) | 0.02 g |
| Methyl ethyl ketone | 3.9 g |

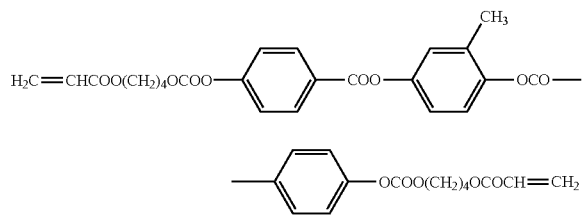

Rod liquid crystalline compound

This coated film was heated in a thermostat at 125° C. for 3 min to align the rod liquid-crystalline compound, and then irradiated with ultraviolet rays emitted from a high pressure mercury lamp of 120 W/cm for 30 sec to crosslink the rod liquid-crystalline compound. The temperature in UV curing was 80° C., and thus the optically anisotropic layer was prepared. The optically anisotropic layer had a thickness of 1.81 μm and a mean refractive index of 1.55. The film was spontaneously cooled to room temperature. An optical film in Example 47 was thereby prepared. Examination of the resulting optically anisotropic layer confirmed that no coating unevenness (unevenness caused by repelling of the coating solution by the alignment layer) and no disturbance in the alignment of the liquid crystal were found.

The optical film in Example 47 had an Re(550) of 125 nm and an Rth(550) of 95 nm at 550 nm.
(Preparation in Comparative Examples 45 and 46)

The optical films in Comparative Examples 45 and 46 were prepared as in Example 47 except that the thickness of the alignment layer was changed to 695 nm and 875 nm, respectively.

(Preparation of Optical Film in Comparative Example 47)
The optical film in Comparative Example 47 was prepared as in Example 1 except that the alignment layer was formed so as to have a refractive index of 1.49 and a thickness of 800 nm according to JP-A-2002-98828.
(Preparation of Optical Film in Example 48)
The optical film in Comparative Example 48 was prepared as the optical film in Example 1 except that the alignment layer was formed so as to have a refractive index of 1.5 and a thickness of 800 nm according to JP-A-2002-98828.
(Preparation of Optical Film in Example 49)
The optical film in Comparative Example 49 was prepared as in Example 1 except that the alignment layer was formed so as to have a refractive index of 1.51 and a thickness of 800 nm according to JP-A-2002-98828.
(Preparation of Optical Film in Example 50)
The optical film in Comparative Example 50 was prepared as in Example 1 except that the alignment layer was formed so as to have a refractive index of 1.54 and a thickness of 780 nm according to JP-A-2002-98828.
(Preparation of Optical Film in Example 51)
The optical film in Comparative Example 51 was prepared as in Example 1 except that the alignment layer was formed so as to have a refractive index of 1.57 and a thickness of 760 nm according to JP-A-2002-98828.
(Preparation of Optical Film in Example 52)
The optical film in Comparative Example 52 was prepared as in Example 1 except that the alignment layer was formed so as to have a refractive index of 1.58 and a thickness of 760 nm according to JP-A-2002-98828.
(Preparation of Optical Film in Comparative Example 48)
The optical film in Comparative Example 48 was prepared as in Example 1 except that the alignment layer was formed so as to have a refractive index of 1.59 and a thickness of 760 nm according to JP-A-2002-98828.
(Preparation of Optical Film in Example 53)
(Preparation of Adhesive Layer A)

Acrylate-based polymer was prepared according to the following procedure.

To a reaction vessel equipped with a cooling pipe, a nitrogen inlet pipe, a thermometer and a stirring device, butyl acrylate (100 parts by mass), acrylic acid (3 parts by mass), 2,2'-azobisisobutyronitrile (0.3 parts by mass) were added together with acetyl acetate in an amount such that the solid content was 30%. The reaction mixture was then reacted in a nitrogen gas flow at 60° C. for 4 hours to give acrylate-based polymer solution.

An adhesive layer A was then prepared with the resulting acrylate-based polymer in accordance with the following procedure.

To 100 parts of acrylate-based polymer (solid basis), 2 parts of trimethylolpropane tolylene diisocyanate (CORONATE L from Japan Polyurethane Corporation) and 0.1 parts of 3-glycidoxypropyltrimethoxysilane were added. The mixture was then applied onto a separate film, which was surface-treated by a silicone peeling agent, using a die coater and then dried at 150° C. for 3 hours to prepare an adhesive layer A. The thickness of the adhesive layer was 20 μm.
(Hard Coat Layer and Low Refractive Index Layer)

The coating solution for the hard coat layer used in the optical film in Example 1 was applied onto a glass plate (coating amount on a solid basis: 12 g/m²). The coating was dried at 100° C. for about 60 seconds and then cured by irradiation with ultraviolet rays from a 160 W/cm air-cooled metal halide lamp (from Eye Graphics Co., Ltd.) at an illuminance of 400 mW/cm² in an exposure dose of 150 mJ/cm² while the system was purged with nitrogen into an oxygen concentration of 0.1 vol % or less, thereby forming a glass plate with the hard coat layer (antireflection layer). The coating solution for the low refractive index layer used in the optical film in Example 1 was applied on the hard coat layer. The drying conditions of the low refractive index layer were 70° C. and 60 seconds, and the ultraviolet curing condition were such that an air-cooled metal halide lamp (from Eye Graphics Co., Ltd.) of 240 W/cm was used at an illuminance of 600 mW/cm² and an exposure dose of 300 mJ/cm² while the system was purged with nitrogen into an oxygen concentration of 0.1 vol % or less. The low refractive index layer had a refractive index of 1.34 and a thickness of 95 nm. In this manner, the glass plate laminated with the hard coat layer and the low refractive index layer in this order was prepared.

(Formation of Alignment Layer and Optical Anisotropic Layer)

The alignment layer was formed on the glass plate so as to have a refractive index of 1.56 and a thickness of 770 nm according to JP-A-2002-98828. The optically-anisotropic layer was then formed on the alignment layer as in Example 1.

The resulting layer composed of the hard coat layer and low refractive index layer was peeled off from the glass plate. This layer was laminated onto a surface of a commercially available norbornene polymer film "ZEONOR ZF14" (from Optes Inc.) with the adhesive agent A. The layer composed of the alignment layer and optically anisotropic layer on the glass was then peeled off from the glass and was laminated with the adhesive agent A onto the other surface of the norbornene polymer film. An optical film in Example 53 was thereby prepared.

The optical structure of the optical film in Example 53 includes the structure of a low refractive index layer/hard coat layer/adhesive layer/norbornene polymer film/adhesive layer/alignment layer/retardation layer.

(Preparation of Optical Film in Comparative Example 49)

The optical film in Comparative Example 49 was prepared as in Example 53 except that the thickness of the alignment layer was changed to 680 nm by adjusting the coating conditions.

(Preparation of Optical Film in Comparative Example 50)

The optical film in Comparative Example 50 was prepared as in Example 53 except that the thickness of the alignment layer was changed to 850 nm by adjusting the coating conditions.

(Preparation of Polarizing Plate of Image Display Device)

A polyvinyl alcohol (PVA) film having a thickness of 80 μm was dipped in an aqueous iodine solution having an iodine concentration of 0.05% by mass at 30° C. for 60 seconds to be dyed, then was stretched in the machine direction at a draw ratio of five to the original length while being dipped in an aqueous boric acid solution having a boric acid concentration of 4% by mass for 60 seconds, and subsequently, dried at 50° C. for 4 min to give a polarizing film having a thickness of 20 μm.

The alkali-saponified retardation film for VA mode (Re (550)=50 nm, Rth(550)=125 nm, manufactured by Fuji Film Co., Ltd) was prepared. The VA mode retardation film was bonded to one side of the resulting polarizing film and each one of optical films in Examples and Comparative Examples was bonded to the other side of the polarizing plate through the pressure-sensitive adhesive agent and adhesive agent to prepare each polarizing plate for the image display device.

Each optical film was bonded to the polarizing plate in which the optically anisotropic layer faced the polarizing plate.

(Preparation of Image Display Device)

A front polarizing plate arranged on a liquid crystal display device (UN40C7000WF manufactured by Samsung) was peeled off. The polarizing plate for the image display device prepared above was attached to the device with the pressure-sensitive adhesive agent and adhesive agent such that the VA mode retardation film faced the liquid cell.

(Evaluation of Minute Interference Unevenness)

The minute interference unevenness of each display device thus prepared was evaluated based on six criteria in accordance with the following procedure.

Each test sample was irradiated using a three band fluorescent lamp (FL20SS EX-D/18: Matsushita Electric Industrial Co., Ltd.) from the front of the corresponding display device, and the irradiated display was observed to evaluate minute interference unevenness, which was then ranked on the basis of the following criteria:

6: No minute interference unevenness was observed.
5: Almost no minute interference unevenness was observed.
4: Slight minute interference unevenness was partially observed.
3: Slight minute interference unevenness was observed (operationally minimum acceptable level)
2: Minute interference unevenness was observed (operationally unacceptable level).
1: Minute interference unevenness was observed strongly.

Results are shown in the following table. The term "refractive index" in the table below refers to "in-plane mean refractive index". The term "disc" in the table refers to the discotic liquid-crystalline compound specified above. The term "rod" refers to the rod liquid-crystalline compound specified above. The figure in the parentheses on the column "optical film thickness" indicates the value Ns that satisfy the foregoing relational formula.

TABLE 2

| | Surface layer | | | Transparent film | | | Alignment layer | | Optical |
|---|---|---|---|---|---|---|---|---|---|
| Ex./ Com. Ex. | Ln layer | Hn + Mn layer | HC layer | Material | Refractive Index | Thickness μm | Refractive Index | Thickness μm | thickness μm |
| Ex. 1 | Pres. | Abs. | Pres. | Cellulose acetate | 1.48 | 80 | 1.53 | 50 | 77(N = 1) |
| Ex. 2 | Pres. | Abs. | Pres. | Cellulose acetate | 1.48 | 80 | 1.53 | 75 | 115(N = 1) |
| Ex. 3 | Pres. | Abs. | Pres. | Cellulose acetate | 1.48 | 80 | 1.53 | 100 | 153(N = 1) |
| Ex. 4 | Pres. | Abs. | Pres. | Cellulose acetate | 1.48 | 80 | 1.53 | 125 | 191(N = 1) |
| Com. Ex. 1 | Pres. | Abs. | Pres. | Cellulose acetate | 1.48 | 80 | 1.53 | 150 | 230 |
| Com. Ex. 2 | Pres. | Abs. | Pres. | Cellulose acetate | 1.48 | 80 | 1.53 | 175 | 268 |
| Com. Ex. 3 | Pres. | Abs. | Pres. | Cellulose acetate | 1.48 | 80 | 1.53 | 200 | 306 |
| Ex. 5 | Pres. | Abs. | Pres. | Cellulose acetate | 1.48 | 80 | 1.53 | 225 | 344(N = 2) |
| Ex. 6 | Pres. | Abs. | Pres. | Cellulose acetate | 1.48 | 80 | 1.53 | 250 | 383(N = 2) |
| Ex. 7 | Pres. | Abs. | Pres. | Cellulose acetate | 1.48 | 80 | 1.53 | 275 | 421(N = 2) |

TABLE 2-continued

| Ex./Com. Ex. | Ln layer | Hn + Mn layer | HC layer | Material | Refractive Index | Thickness μm | Refractive Index | Thick- μm | Optical thickness μm |
|---|---|---|---|---|---|---|---|---|---|
| Ex. 8 | Pres. | Abs. | Pres. | Cellulose acetate | 1.48 | 80 | 1.53 | 300 | 459(N = 2) |
| Com. Ex. 4 | Pres. | Abs. | Pres. | Cellulose acetate | 1.48 | 80 | 1.53 | 325 | 497 |
| Com. Ex. 5 | Pres. | Abs. | Pres. | Cellulose acetate | 1.48 | 80 | 1.53 | 350 | 536 |
| Com. Ex. 6 | Pres. | Abs. | Pres. | Cellulose acetate | 1.48 | 80 | 1.53 | 375 | 574 |
| Ex. 9 | Pres. | Abs. | Pres. | Cellulose acetate | 1.48 | 80 | 1.53 | 400 | 612(N = 3) |
| Ex. 10 | Pres. | Abs. | Pres. | Cellulose acetate | 1.48 | 80 | 1.53 | 425 | 650(N = 3) |
| Ex. 11 | Pres. | Abs. | Pres. | Cellulose acetate | 1.48 | 80 | 1.53 | 450 | 689(N = 3) |
| Ex. 12 | Pres. | Abs. | Pres. | Cellulose acetate | 1.48 | 80 | 1.53 | 475 | 727(N = 3) |
| Com. Ex. 7 | Pres. | Abs. | Pres. | Cellulose acetate | 1.48 | 80 | 1.53 | 500 | 765 |
| Com. Ex. 8 | Pres. | Abs. | Pres. | Cellulose acetate | 1.48 | 80 | 1.53 | 525 | 803 |
| Com. Ex. 9 | Pres. | Abs. | Pres. | Cellulose acetate | 1.48 | 80 | 1.53 | 550 | 842 |

| Ex./Com. Ex. | Retardation layer Material | Refractive Index | Thickness μm | Re nm | Rth nm | Rank |
|---|---|---|---|---|---|---|
| Ex. 1 | Disc | 1.6 | 1.6 | 125 | −3 | 4 |
| Ex. 2 | Disc | 1.6 | 1.6 | 125 | −3 | 5 |
| Ex. 3 | Disc | 1.6 | 1.6 | 125 | −3 | 4 |
| Ex. 4 | Disc | 1.6 | 1.6 | 125 | −3 | 3 |
| Com. Ex. 1 | Disc | 1.6 | 1.6 | 125 | −3 | 1 |
| Com. Ex. 2 | Disc | 1.6 | 1.6 | 125 | −3 | 1 |
| Com. Ex. 3 | Disc | 1.6 | 1.6 | 125 | −3 | 2 |
| Ex. 5 | Disc | 1.6 | 1.6 | 125 | −3 | 4 |
| Ex. 6 | Disc | 1.6 | 1.6 | 125 | −3 | 5 |
| Ex. 7 | Disc | 1.6 | 1.6 | 125 | −3 | 4 |
| Ex. 8 | Disc | 1.6 | 1.6 | 125 | −3 | 3 |
| Com. Ex. 4 | Disc | 1.6 | 1.6 | 125 | −3 | 1 |
| Com. Ex. 5 | Disc | 1.6 | 1.6 | 125 | −3 | 1 |
| Com. Ex. 6 | Disc | 1.6 | 1.6 | 125 | −3 | 2 |
| Ex. 9 | Disc | 1.6 | 1.6 | 125 | −3 | 4 |
| Ex. 10 | Disc | 1.6 | 1.6 | 125 | −3 | 5 |
| Ex. 11 | Disc | 1.6 | 1.6 | 125 | −3 | 4 |
| Ex. 12 | Disc | 1.6 | 1.6 | 125 | −3 | 3 |
| Com. Ex. 7 | Disc | 1.6 | 1.6 | 125 | −3 | 2 |
| Com. Ex. 8 | Disc | 1.6 | 1.6 | 125 | −3 | 1 |
| Com. Ex. 9 | Disc | 1.6 | 1.6 | 125 | −3 | 2 |

Ex. indicates Example, and
Com. Ex. Indicates Comparative Example.
Pres. indicates that the layer is provided, and
Abs. indicates that the layer is not provided.

TABLE 3

| Ex./Com. Ex. | Surface layer Ln layer | Hn + Mn layer | HC layer | Transparent film Material | Refractive Index | Thickness μm | Alignment layer Refractive Index | Thick- μm | Optical thickness μm |
|---|---|---|---|---|---|---|---|---|---|
| Ex. 13 | Pres. | Abs. | Pres. | Cellulose acetate | 1.48 | 80 | 1.53 | 575 | 880(N = 4) |
| Ex. 14 | Pres. | Abs. | Pres. | Cellulose acetate | 1.48 | 80 | 1.53 | 600 | 918(N = 4) |
| Ex. 15 | Pres. | Abs. | Pres. | Cellulose acetate | 1.48 | 80 | 1.53 | 625 | 956(N = 4) |
| Ex. 16 | Pres. | Abs. | Pres. | Cellulose acetate | 1.48 | 80 | 1.53 | 650 | 995(N = 4) |
| Com. Ex. 10 | Pres. | Abs. | Pres. | Cellulose acetate | 1.48 | 80 | 1.53 | 675 | 1033 |
| Com. Ex. 11 | Pres. | Abs. | Pres. | Cellulose acetate | 1.48 | 80 | 1.53 | 695 | 1063 |
| Com. Ex. 12 | Pres. | Abs. | Pres. | Cellulose acetate | 1.48 | 80 | 1.53 | 700 | 1071 |
| Com. Ex. 13 | Pres. | Abs. | Pres. | Cellulose acetate | 1.48 | 80 | 1.53 | 720 | 1102 |
| Com. Ex. 14 | Pres. | Abs. | Pres. | Cellulose acetate | 1.48 | 80 | 1.53 | 725 | 1109 |
| Ex. 17 | Pres. | Abs. | Pres. | Cellulose acetate | 1.48 | 80 | 1.53 | 735 | 1125(N = 5) |
| Ex. 18 | Pres. | Abs. | Pres. | Cellulose acetate | 1.48 | 80 | 1.53 | 750 | 1148(N = 5) |
| Ex. 19 | Pres. | Abs. | Pres. | Cellulose acetate | 1.48 | 80 | 1.53 | 755 | 1155(N = 5) |
| Ex. 20 | Pres. | Abs. | Pres. | Cellulose acetate | 1.48 | 80 | 1.53 | 770 | 1178(N = 5) |
| Ex. 21 | Pres. | Abs. | Pres. | Cellulose acetate | 1.48 | 80 | 1.53 | 785 | 1201(N = 5) |
| Ex. 22 | Pres. | Abs. | Pres. | Cellulose acetate | 1.48 | 80 | 1.53 | 800 | 1224(N = 5) |
| Ex. 23 | Pres. | Abs. | Pres. | Cellulose acetate | 1.48 | 80 | 1.53 | 815 | 1247(N = 5) |
| Ex. 24 | Pres. | Abs. | Pres. | Cellulose acetate | 1.48 | 80 | 1.53 | 825 | 1262(N = 5) |
| Ex. 25 | Pres. | Abs. | Pres. | Cellulose acetate | 1.48 | 80 | 1.53 | 830 | 1270(N = 5) |
| Com. Ex. 15 | Pres. | Abs. | Pres. | Cellulose acetate | 1.48 | 80 | 1.53 | 850 | 1301 |
| Com. Ex. 16 | Pres. | Abs. | Pres. | Cellulose acetate | 1.48 | 80 | 1.53 | 870 | 1331 |
| Com. Ex. 17 | Pres. | Abs. | Pres. | Cellulose acetate | 1.48 | 80 | 1.53 | 875 | 1339 |
| Com. Ex. 18 | Pres. | Abs. | Pres. | Cellulose acetate | 1.48 | 80 | 1.53 | 900 | 1377 |

TABLE 3-continued

| Ex./Com. Ex. | Retardation layer | | | Optical | | Rank |
|---|---|---|---|---|---|---|
| | Material | Refractive Index | Thickness μm | Re nm | Rth nm | |
| Ex. 13 | Disc | 1.6 | 1.6 | 125 | −3 | 4 |
| Ex. 14 | Disc | 1.6 | 1.6 | 125 | −3 | 5 |
| Ex. 15 | Disc | 1.6 | 1.6 | 125 | −3 | 4 |
| Ex. 16 | Disc | 1.6 | 1.6 | 125 | −3 | 3 |
| Com. Ex. 10 | Disc | 1.6 | 1.6 | 125 | −3 | 2 |
| Com. Ex. 11 | Disc | 1.6 | 1.6 | 125 | −3 | 1 |
| Com. Ex. 12 | Disc | 1.6 | 1.6 | 125 | −3 | 1 |
| Com. Ex. 13 | Disc | 1.6 | 1.6 | 125 | −3 | 2 |
| Com. Ex. 14 | Disc | 1.6 | 1.6 | 125 | −3 | 2 |
| Ex. 17 | Disc | 1.6 | 1.6 | 125 | −3 | 3 |
| Ex. 18 | Disc | 1.6 | 1.6 | 125 | −3 | 3 |
| Ex. 19 | Disc | 1.6 | 1.6 | 125 | −3 | 4 |
| Ex. 20 | Disc | 1.6 | 1.6 | 125 | −3 | 5 |
| Ex. 21 | Disc | 1.6 | 1.6 | 125 | −3 | 5 |
| Ex. 22 | Disc | 1.6 | 1.6 | 125 | −3 | 5 |
| Ex. 23 | Disc | 1.6 | 1.6 | 125 | −3 | 4 |
| Ex. 24 | Disc | 1.6 | 1.6 | 125 | −3 | 3 |
| Ex. 25 | Disc | 1.6 | 1.6 | 125 | −3 | 3 |
| Com. Ex. 15 | Disc | 1.6 | 1.6 | 125 | −3 | 2 |
| Com. Ex. 16 | Disc | 1.6 | 1.6 | 125 | −3 | 1 |
| Com. Ex. 17 | Disc | 1.6 | 1.6 | 125 | −3 | 1 |
| Com. Ex. 18 | Disc | 1.6 | 1.6 | 125 | −3 | 2 |

Ex. indicates Example, and
Com. Ex. Indicates Comparative Example.
Pres. indicates that the layer is provided, and
Abs. indicates that the layer is not provided.

TABLE 4

| Ex./Com. Ex. | Surface layer | | | Transparent film | | | Alignment layer | | | Retardation layer | | Optical properties | | Rank |
|---|---|---|---|---|---|---|---|---|---|---|---|---|---|---|
| | Ln layer | Hn + Mn layer | HC layer | Material | Refractive Index | Thickness μm | Refractive Index | Thickness μm | Optical thickness μm | Material | Refractive Index | Re nm | Rth nm | |
| Ex. 26 | Pres. | Abs. | Pres. | Cellulose acetate | 1.48 | 80 | 1.53 | 925 | 1415(N = 6) | Disc | 1.6 | 125 | −3 | 3 |
| Ex. 27 | Pres. | Abs. | Pres. | Cellulose acetate | 1.48 | 80 | 1.53 | 950 | 1454(N = 6) | Disc | 1.6 | 125 | −3 | 5 |
| Ex. 28 | Pres. | Abs. | Pres. | Cellulose acetate | 1.48 | 80 | 1.53 | 975 | 1492(N = 6) | Disc | 1.6 | 125 | −3 | 5 |
| Ex. 29 | Pres. | Abs. | Pres. | Cellulose acetate | 1.48 | 80 | 1.53 | 1000 | 1530(N = 6) | Disc | 1.6 | 125 | −3 | 3 |
| Com. Ex. 19 | Pres. | Abs. | Pres. | Cellulose acetate | 1.48 | 80 | 1.53 | 1025 | 1568 | Disc | 1.6 | 125 | −3 | 2 |
| Com. Ex. 20 | Pres. | Abs. | Pres. | Cellulose acetate | 1.48 | 80 | 1.53 | 1050 | 1607 | Disc | 1.6 | 125 | −3 | 1 |
| Com. Ex. 21 | Pres. | Abs. | Pres. | Cellulose acetate | 1.48 | 80 | 1.53 | 1075 | 1645 | Disc | 1.6 | 125 | −3 | 2 |
| Ex. 30 | Pres. | Abs. | Pres. | Cellulose acetate | 1.48 | 80 | 1.53 | 1100 | 1683(N = 7) | Disc | 1.6 | 125 | −3 | 3 |
| Ex. 31 | Pres. | Abs. | Pres. | Cellulose acetate | 1.48 | 80 | 1.53 | 1125 | 1721(N = 7) | Disc | 1.6 | 125 | −3 | 5 |
| Ex. 32 | Pres. | Abs. | Pres. | Cellulose acetate | 1.48 | 80 | 1.53 | 1150 | 1760(N = 7) | Disc | 1.6 | 125 | −3 | 5 |
| Ex. 33 | Pres. | Abs. | Pres. | Cellulose acetate | 1.48 | 80 | 1.53 | 1175 | 1798(N = 7) | Disc | 1.6 | 125 | −3 | 3 |
| Com. Ex. 22 | Pres. | Abs. | Pres. | Cellulose acetate | 1.48 | 80 | 1.53 | 1200 | 1836 | Disc | 1.6 | 125 | −3 | 2 |
| Com. Ex. 23 | Pres. | Abs. | Pres. | Cellulose acetate | 1.48 | 80 | 1.53 | 1225 | 1874 | Disc | 1.6 | 125 | −3 | 1 |
| Com. Ex. 24 | Pres. | Abs. | Pres. | Cellulose acetate | 1.48 | 80 | 1.53 | 1250 | 1913 | Disc | 1.6 | 125 | −3 | 2 |
| Ex. 34 | Pres. | Abs. | Pres. | Cellulose acetate | 1.48 | 80 | 1.53 | 1275 | 1951(N = 8) | Disc | 1.6 | 125 | −3 | 3 |
| Ex. 35 | Pres. | Abs. | Pres. | Cellulose acetate | 1.48 | 80 | 1.53 | 1300 | 1989(N = 8) | Disc | 1.6 | 125 | −3 | 5 |
| Ex. 36 | Pres. | Abs. | Pres. | Cellulose acetate | 1.48 | 80 | 1.53 | 1325 | 2027(N = 8) | Disc | 1.6 | 125 | −3 | 5 |
| Ex. 37 | Pres. | Abs. | Pres. | Cellulose acetate | 1.48 | 80 | 1.53 | 1350 | 2066 | Disc | 1.6 | 125 | −3 | 3 |
| Com. Ex. 25 | Pres. | Abs. | Pres. | Cellulose acetate | 1.48 | 80 | 1.53 | 1375 | 2104 | Disc | 1.6 | 125 | −3 | 2 |
| Com. Ex. 26 | Pres. | Abs. | Pres. | Cellulose acetate | 1.48 | 80 | 1.53 | 1400 | 2142 | Disc | 1.6 | 125 | −3 | 1 |

Ex. indicates Example, and
Com. Ex. Indicates Comparative Example.
Pres. indicates that the layer is provided, and
Abs. indicates that the layer is not provided.

TABLE 5

| Ex./Com. Ex. | Surface layer | | | Transparent film | | | Alignment layer | | Optical |
|---|---|---|---|---|---|---|---|---|---|
| | Ln layer | Hn + Mn | HC layer | Material | Refractive Index | Thickness μm | Refractive Index | Thickness μm | thickness μm |
| Ex. 38 | Pres | Pres. | Pres. | Cellulose acetate | 1.48 | 60 | 1.53 | 785 | 1201(N = 5) |
| Ex. 39 | Abs. | Abs. | Pres. | Cellulose acetate | 1.48 | 60 | 1.53 | 785 | 1201(N = 5) |
| Ex. 40 | Abs. | Abs. | Abs. | Cellulose acetate | 1.48 | 60 | 1.53 | 785 | 1201(N = 5) |
| Com. Ex. 27 | Pres | Pres. | Pres. | Cellulose acetate | 1.48 | 60 | 1.53 | 695 | 1063 |
| Com. Ex. 28 | Abs. | Abs. | Pres. | Cellulose acetate | 1.48 | 60 | 1.53 | 695 | 1063 |
| Com. Ex. 29 | Abs. | Abs. | Abs. | Cellulose acetate | 1.48 | 60 | 1.53 | 695 | 1063 |
| Com. Ex. 30 | Pres | Pres. | Pres. | Cellulose acetate | 1.48 | 60 | 1.53 | 870 | 1331 |
| Com. Ex. 31 | Abs. | Abs. | Pres. | Cellulose acetate | 1.48 | 60 | 1.53 | 870 | 1331 |
| Com. Ex. 32 | Abs. | Abs. | Abs. | Cellulose acetate | 1.48 | 60 | 1.53 | 870 | 1331 |

| Ex./Com. Ex. | Retardation layer | | | Optical | | |
|---|---|---|---|---|---|---|
| | Material | Refractive Index | Thickness μm | Re nm | Rth nm | Rank |
| Ex. 38 | Disc | 1.6 | 1.6 | 125 | −3 | 5 |
| Ex. 39 | Disc | 1.6 | 1.6 | 125 | −3 | 5 |
| Ex. 40 | Disc | 1.6 | 1.6 | 125 | −3 | 5 |
| Com. Ex. 27 | Disc | 1.6 | 1.6 | 125 | −3 | 1 |
| Com. Ex. 28 | Disc | 1.6 | 1.6 | 125 | −3 | 1 |
| Com. Ex. 29 | Disc | 1.6 | 1.6 | 125 | −3 | 1 |
| Com. Ex. 30 | Disc | 1.6 | 1.6 | 125 | −3 | 1 |
| Com. Ex. 31 | Disc | 1.6 | 1.6 | 125 | −3 | 1 |
| Com. Ex. 32 | Disc | 1.6 | 1.6 | 125 | −3 | 1 |

Ex. indicates Example, and
Com. Ex. Indicates Comparative Example.
Pres. indicates that the layer is provided, and
Abs. indicates that the layer is not provided.

TABLE 6

| Ex./Com. Ex. | Surface layer | | | Transparent film | | | Alignment layer | | Optical |
|---|---|---|---|---|---|---|---|---|---|
| | Ln layer | Hn + Mn layer | HC layer | Material | Refractive Index | Thickness μm | Refractive Index | Thickness μm | thickness μm |
| Ex. 41 | Pres. | Abs. | Pres. | Cellulose acetate | 1.48 | 150 | 1.53 | 785 | 1201(N = 5) |
| Ex. 42 | Pres. | Abs. | Pres. | Cellulose acetate | 1.48 | 100 | 1.53 | 785 | 1201(N = 5) |
| Ex. 43 | Pres. | Abs. | Pres. | Cellulose acetate | 1.48 | 60 | 1.53 | 785 | 1201(N = 5) |
| Ex. 44 | Pres. | Abs. | Pres. | Cellulose acetate | 1.48 | 40 | 1.53 | 785 | 1201(N = 5) |
| Ex. 45 | Pres. | Abs. | Pres. | Cellulose acetate | 1.48 | 20 | 1.53 | 785 | 1201(N = 5) |
| Ex. 46 | Pres. | Abs. | Pres. | Cellulose acetate | 1.48 | 10 | 1.53 | 785 | 1201(N = 5) |
| Com. Ex. 33 | Pres. | Abs. | Pres. | Cellulose acetate | 1.48 | 150 | 1.53 | 695 | 1063 |
| Com. Ex. 34 | Pres. | Abs. | Pres. | Cellulose acetate | 1.48 | 100 | 1.53 | 695 | 1063 |
| Com. Ex. 35 | Pres. | Abs. | Pres. | Cellulose acetate | 1.48 | 60 | 1.53 | 695 | 1063 |
| Com. Ex. 36 | Pres. | Abs. | Pres. | Cellulose acetate | 1.48 | 40 | 1.53 | 695 | 1063 |
| Com. Ex. 37 | Pres. | Abs. | Pres. | Cellulose acetate | 1.48 | 20 | 1.53 | 695 | 1063 |
| Com. Ex. 38 | Pres. | Abs. | Pres. | Cellulose acetate | 1.48 | 10 | 1.53 | 695 | 1063 |
| Com. Ex. 39 | Pres. | Abs. | Pres. | Cellulose acetate | 1.48 | 150 | 1.53 | 870 | 1331 |
| Com. Ex. 40 | Pres. | Abs. | Pres. | Cellulose acetate | 1.48 | 100 | 1.53 | 870 | 1331 |
| Com. Ex. 41 | Pres. | Abs. | Pres. | Cellulose acetate | 1.48 | 60 | 1.53 | 870 | 1331 |
| Com. Ex. 42 | Pres. | Abs. | Pres. | Cellulose acetate | 1.48 | 40 | 1.53 | 870 | 1331 |
| Com. Ex. 43 | Pres. | Abs. | Pres. | Cellulose acetate | 1.48 | 20 | 1.53 | 870 | 1331 |
| Com. Ex. 44 | Pres. | Abs. | Pres. | Cellulose acetate | 1.48 | 10 | 1.53 | 870 | 1331 |

| Ex./Com. Ex. | Retardation layer | | | Optical | | |
|---|---|---|---|---|---|---|
| | Material | Refractive Index | Thickness μm | Re nm | Rth nm | Rank |
| Ex. 41 | Disc | 1.6 | 1.6 | 125 | 40 | 5 |
| Ex. 42 | Disc | 1.6 | 1.6 | 125 | 10 | 5 |
| Ex. 43 | Disc | 1.6 | 1.6 | 125 | −15 | 5 |
| Ex. 44 | Disc | 1.6 | 1.6 | 125 | −27 | 5 |
| Ex. 45 | Disc | 1.6 | 1.6 | 125 | −39 | 5 |
| Ex. 46 | Disc | 1.6 | 1.6 | 125 | −45 | 5 |
| Com. Ex. 33 | Disc | 1.6 | 1.6 | 125 | 40 | 1 |
| Com. Ex. 34 | Disc | 1.6 | 1.6 | 125 | 10 | 1 |

TABLE 6-continued

| | | | | | | | |
|---|---|---|---|---|---|---|---|
| | Com. Ex. 35 | Disc | 1.6 | 1.6 | 125 | -15 | 1 |
| | Com. Ex. 36 | Disc | 1.6 | 1.6 | 125 | -27 | 1 |
| | Com. Ex. 37 | Disc | 1.6 | 1.6 | 125 | -39 | 1 |
| | Com. Ex. 38 | Disc | 1.6 | 1.6 | 125 | -45 | 1 |
| | Com. Ex. 39 | Disc | 1.6 | 1.6 | 125 | 40 | 1 |
| | Com. Ex. 40 | Disc | 1.6 | 1.6 | 125 | 10 | 1 |
| | Com. Ex. 41 | Disc | 1.6 | 1.6 | 125 | -15 | 1 |
| | Com. Ex. 42 | Disc | 1.6 | 1.6 | 125 | -27 | 1 |
| | Com. Ex. 43 | Disc | 1.6 | 1.6 | 125 | -39 | 1 |
| | Com. Ex. 44 | Disc | 1.6 | 1.6 | 125 | -45 | 1 |

Ex. indicates Example, and

Com. Ex. Indicates Comparative Example.

Pres. indicates that the layer is provided, and

Abs. indicates that the layer is not provided.

TABLE 7

| | Surface layer | | | Transparent film | | | Alignment layer | | Optical |
|---|---|---|---|---|---|---|---|---|---|
| Ex./Com. Ex. | Ln layer | Hn + Mn layer | HC layer | Material | Refractive Index | Thickness μm | Refractive Index | Thickness μm | thickness μm |
| Ex. 47 | Pres. | Abs. | Pres. | Cellulose acetate | 1.48 | 80 | 1.53 | 785 | 1201(N = 5) |
| Com. Ex. 45 | Pres. | Abs. | Pres. | Cellulose acetate | 1.48 | 80 | 1.53 | 695 | 1063 |
| Com. Ex. 46 | Pres. | Abs. | Pres. | Cellulose acetate | 1.48 | 80 | 1.53 | 870 | 1331 |

| | Retardation layer | | | Optical | | |
|---|---|---|---|---|---|---|
| Ex./Com. Ex. | Material | Refractive Index | Thickness μm | Re nm | Rth nm | Rank |
| Ex. 47 | Rod | 1.55 | 1.8 | 125 | 95 | 5 |
| Com. Ex. 45 | Rod | 1.55 | 1.8 | 125 | 95 | 1 |
| Com. Ex. 46 | Rod | 1.55 | 1.8 | 125 | 95 | 1 |

Ex. indicates Example, and

Com. Ex. Indicates Comparative Example.

Pres. indicates that the layer is provided, and

Abs. indicates that the layer is not provided.

TABLE 8

| | Surface layer | | | Transparent film | | | Alignment layer | | Optical |
|---|---|---|---|---|---|---|---|---|---|
| Ex./Com. Ex. | Ln layer | Hn + Mn layer | HC layer | Material | Refractive Index | Thickness μm | Refractive Index | Thickness μm | thickness μm |
| Com. Ex. 47 | Pres. | Abs. | Pres. | Cellulose acetate | 1.48 | 80 | 1.49 | 800 | 1192(N = 5) |
| Ex. 48 | Pres. | Abs. | Pres. | Cellulose acetate | 1.48 | 80 | 1.5 | 800 | 1200(N = 5) |
| Ex. 49 | Pres. | Abs. | Pres. | Cellulose acetate | 1.48 | 80 | 1.51 | 800 | 1208(N = 5) |
| Ex. 50 | Pres. | Abs. | Pres. | Cellulose acetate | 1.48 | 80 | 1.54 | 780 | 1201(N = 5) |
| Ex. 51 | Pres. | Abs. | Pres. | Cellulose acetate | 1.48 | 80 | 1.57 | 760 | 1193(N = 5) |
| Ex. 52 | Pres. | Abs. | Pres. | Cellulose acetate | 1.48 | 80 | 1.58 | 760 | 1201(N = 5) |
| Com. Ex. 48 | Pres. | Abs. | Pres. | Cellulose acetate | 1.48 | 80 | 1.59 | 760 | 1208(N = 5) |

| | Retardation layer | | | Optical properties | | |
|---|---|---|---|---|---|---|
| Ex./Com. Ex. | Material | Refractive Index | Thickness μm | Re nm | Rth nm | Rank |
| Com. Ex. 47 | Disc | 1.6 | 1.6 | 125 | -3 | 2 |
| Ex. 48 | Disc | 1.6 | 1.6 | 125 | -3 | 4 |
| Ex. 49 | Disc | 1.6 | 1.6 | 125 | -3 | 5 |
| Ex. 50 | Disc | 1.6 | 1.6 | 125 | -3 | 6 |
| Ex. 51 | Disc | 1.6 | 1.6 | 125 | -3 | 5 |

TABLE 8-continued

| | | | | | | | |
|---|---|---|---|---|---|---|---|
| Ex. 52 | Disc | 1.6 | 1.6 | 125 | −3 | 4 |
| Com. Ex. 48 | Disc | 1.6 | 1.6 | 125 | −3 | 2 |

Ex. indicates Example, and
Com. Ex. Indicates Comparative Example.
Pres. indicates that the layer is provided, and
Abs. indicates that the layer is not provided.

TABLE 9

| | Surface layer | | | Transparent film | | | Alignment layer | | | Retardation layer | | | | |
|---|---|---|---|---|---|---|---|---|---|---|---|---|---|---|
| Ex./ Com. Ex | Hn + Ln layer | Mn layer | HC layer | Material | Refractive Index | Thickness μm | Refractive Index | Thickness μm | Optical thickness μm | Material | Refractive Index | Thickness μm | Re nm | Rth nm | Rank |
| Ex. 53 | Pres. | Abs. | Pres. | Cyclic olefin polymer | 1.53 | 100 (140*1) | 1.56 | 770 | 1201 (N = 5) | Disc | 1.6 | 1.6 | 125 | −50 | 6 |
| Com. Ex. 49 | Pres. | Abs. | Pres. | Cyclic olefin polymer | 1.53 | 100 (140*1) | 1.56 | 680 | 1061 | Disc | 1.6 | 1.6 | 125 | −50 | 1 |
| Com. Ex. 50 | Pres. | Abs. | Pres. | Cyclic olefin polymer | 1.53 | 100 (140*1) | 1.56 | 850 | 1326 | Disc | 1.6 | 1.6 | 125 | −50 | 1 |

Ex. indicates Example, and
Com. Ex. Indicates Comparative Example.
Pres. indicates that the layer is provided, and
Abs. indicates that the layer is not provided.
*1 Thickness including the adhesive layer having a refractive index of 1.53

The present disclosure relates to the subject matter contained in Japanese Patent Application No. 108101/2011 filed on May 13, 2011, which is expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An optical film comprising a transparent film having a thickness of 10 μm to 150 μm, an alignment layer which is formed on one surface of the transparent film, and a retardation layer comprising a liquid-crystalline compound, in this order, on the transparent film, and comprising at least one hard coat layer on the other side of the transparent film, wherein values of in-plain mean refractive indices thereof satisfy the formula:

the retardation layer comprising a liquid-crystalline compound>the alignment layer>the transparent film;

the difference in in-plane mean refractive indices between the alignment layer and the retardation layer comprising a liquid-crystalline compound and the difference in in-plane mean refractive indices between the alignment layer and the transparent film are each 0.02 or more; and the optical thickness D of the alignment layer satisfies the formula:

$$270 \times N - 150 - 75 \text{ nm} \leq D \leq 270 \times N - 150 + 75 \text{ nm} (1 \leq N \leq 8)$$

where $N$ is a natural number).

2. The optical film according to claim 1, wherein the transparent film is a cellulose acylate film or a cyclic olefin polymer film.

3. The optical film according to claim 1, comprising a low refractive index layer disposed on the hard coat layer deposited on the opposite side of the transparent film;

the low refractive index layer having a refractive index lower than a refractive index of the transparent film.

4. The optical film according to claim 3, comprising at least one high refractive index layer having a refractive index higher than a refractive index of the transparent film.

5. The optical film according to claim 1, having an in-plane retardation at 550 nm of 80 to 200 nm and a retardation in thickness direction at 550 nm of −100 to 200 nm.

6. The optical film according to claim 1, wherein the liquid-crystalline compound is a discotic-like or rod-like liquid-crystalline compound.

7. The optical film according to claim 1, wherein the retardation layer comprising the liquid-crystalline compound is a patterned retardation layer comprising alternately-disposed patterns of a first and a second retardation regions which differ each other with respect to at least one of the in-plane slow axis and the in-plane retardation.

8. An optical film comprising a transparent film having a thickness of 10 μm to 150 μm, an alignment layer and a retardation layer, in this order, on the transparent film, and at least one hard coat layer on the other side of the transparent film, wherein values of in-plain mean refractive indices thereof satisfy the formula:

the retardation layer>the alignment layer>the transparent film;

the difference in in-plane mean refractive indices between the retardation layer and the alignment layer and the difference in in-plane mean refractive indices between the alignment layer and the transparent film are each 0.02 or more; and the optical thickness D of the alignment layer satisfies the formula:

1200−75 nm≤D≤1200+75 nm.

9. The optical film according to claim 8, wherein the transparent film is a cellulose acylate film or a cyclic olefin polymer film.

10. The optical film according to claim 8, comprising a low refractive index layer disposed on the hard coat layer deposited on the opposite side of the transparent film;
the low refractive index layer having a refractive index lower than a refractive index of the transparent film.

11. The optical film according to claim 10, comprising at least one high refractive index layer having a refractive index higher than a refractive index of the transparent film.

12. The optical film according to claim 8, having an in-plane retardation at 550 nm of 80 to 200 nm and a retardation in thickness direction at 550 nm of −100 to 200 nm.

13. The optical film according to claim 8, wherein the liquid-crystalline compound is a discotic-like or rod-like liquid-crystalline compound.

14. The optical film according to claim 8, wherein the retardation layer comprising the liquid-crystalline compound is a patterned retardation layer comprising alternately-disposed patterns of a first and a second retardation regions which differ each other with respect to at least one of the in-plane slow axis and the in-plane retardation.

15. A polarizing plate comprising an optical film according to claim 1 and a polarizing film.

16. The polarizing plate according to claim 15, wherein the in-plane slow axis of the retardation layer intersects the absorption axis of the polarizing film at an angle of 45°.

17. An image display device comprising a display panel and the polarizing plate according to claim 15 disposed at the viewing side of the display panel.

18. A 3D image display system comprising at least one image display device according to claim 17; and
a polarizing film which allows an image displayed on the image display device to transmit so as to be perceived as a 3D image.

19. The optical film according to claim 1, wherein the difference in in-plane mean refractive indices between the alignment layer and the retardation layer comprising a liquid-crystalline compound and the difference in in-plane mean refractive indices between the alignment layer and the transparent film are each 0.03 or more.

20. The optical film according to claim 8, wherein the difference in in-plane mean refractive indices between the alignment layer and the retardation layer comprising a liquid-crystalline compound and the difference in in-plane mean refractive indices between the alignment layer and the transparent film are each 0.03 or more.

* * * * *